US012192605B2

(12) United States Patent
Reading et al.

(10) Patent No.: US 12,192,605 B2
(45) Date of Patent: Jan. 7, 2025

(54) SYSTEMS AND METHODS FOR IMPLEMENTING PRIVACY FILTERS WITH VARIABLE OBFUSCATION FOR VIDEO COMMUNICATIONS

(71) Applicant: Samsung Electronics Company, Ltd., Gyeonggi-do (KR)

(72) Inventors: Dean N. Reading, Sunnyvale, CA (US); Marc Estruch Tena, San Jose, CA (US); Lin Sun, San Jose, CA (US); Fulya Yilmaz, San Francisco, CA (US); Cathy Kim, Palo Alto, CA (US); Hanna Fuhrmann, San Francisco, CA (US); Catherine S. Kim, San Jose, CA (US); Jun Yeon Cho, San Jose, CA (US); Imran Mohammed, Santa Clara, CA (US); Curtis D. Aumiller, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 17/725,466

(22) Filed: Apr. 20, 2022

(65) Prior Publication Data
US 2023/0345100 A1 Oct. 26, 2023

(51) Int. Cl.
H04N 23/55 (2023.01)
G02B 5/28 (2006.01)
(Continued)

(52) U.S. Cl.
CPC ............... H04N 23/55 (2023.01); G02B 5/28 (2013.01); G06F 21/83 (2013.01); G06T 7/75 (2017.01); G06V 40/176 (2022.01); G06V 40/20 (2022.01)

(58) Field of Classification Search
CPC ........ H04N 23/55; G06T 7/75; G06V 40/176; G06V 40/20; G02B 5/28
(Continued)

(56) References Cited

U.S. PATENT DOCUMENTS 6,771,303 B2  8/2004  Zhang
8,253,852 B2  8/2012  Bilbrey
(Continued)

FOREIGN PATENT DOCUMENTS

JP    2020-202567 A   12/2020
KR   10-2020-0108196 A   9/2020
KR   10-2021-0047112 A   4/2021

OTHER PUBLICATIONS

PCT Search Report and written decision in PCT/KR2023/002595, May 24, 2023.
(Continued)

Primary Examiner — Joel W Fosselman

(57) ABSTRACT

In one embodiment, a method includes maintaining a video communication between two or more client devices with each client device comprising cameras and being associated with a respective video stream in the video communication, determining scene data within a field of view in a real-world environment captured by one or more of the cameras of a first client device of the two or more client devices, determining a privacy filter to apply to a first video stream associated with the first client device based on the scene data, and providing instructions to apply the privacy filter to the first video stream in the video communication.

22 Claims, 23 Drawing Sheets

1950

1960

1970

(51) Int. Cl.
*G06F 21/83* (2013.01)
*G06T 7/73* (2017.01)
*G06V 40/16* (2022.01)
*G06V 40/20* (2022.01)

(58) Field of Classification Search
USPC .......................................................... 348/360
See application file for complete search history.

(56) References Cited

U.S. PATENT DOCUMENTS

| | | | |
|---|---|---|---|
| 9,088,694 B2 | 7/2015 | Navon | |
| 9,167,275 B1 | 10/2015 | Daily | |
| 10,075,491 B2 | 9/2018 | Smus | |
| 10,362,272 B1 | 7/2019 | van Os | |
| 10,462,420 B2 | 10/2019 | Cranfill | |
| 10,721,440 B2 | 7/2020 | Sugihara | |
| 10,917,608 B1 | 2/2021 | Faulkner | |
| 10,951,947 B2 | 3/2021 | Faulkner | |
| 2011/0063440 A1 | 3/2011 | Neustaedter | |
| 2013/0194375 A1 | 8/2013 | Michrowski | |
| 2018/0032224 A1 | 2/2018 | Cornell | |
| 2018/0343294 A1 | 11/2018 | Rands | |
| 2019/0026874 A1* | 1/2019 | Jin | G06F 3/013 |
| 2019/0349512 A1 | 11/2019 | Bently | |
| 2020/0098096 A1* | 3/2020 | Moloney | G06F 21/6254 |
| 2021/0081003 A1 | 3/2021 | Bristol | |
| 2021/0120157 A1 | 4/2021 | Xu | |
| 2021/0185208 A1* | 6/2021 | Djakovic | H04N 23/75 |
| 2022/0116435 A1 | 4/2022 | Hartnett | |

OTHER PUBLICATIONS

Non-final office action in U.S. Appl. No. 17/725,468, Nov. 6, 2023.
Final office action in U.S. Appl. No. 17/725,468, May 14, 2024.
Non-final office action in U.S. Appl. No. 17/725,468, Aug. 2, 2024.
Notice of Allowance in U.S. Appl. No. 17/725,468, Nov. 20, 2024.

* cited by examiner

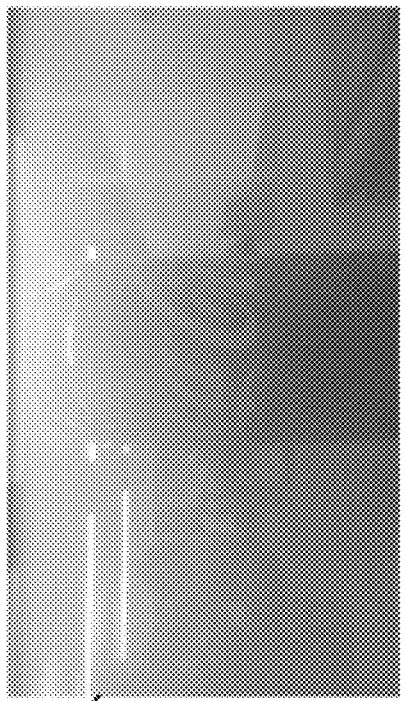
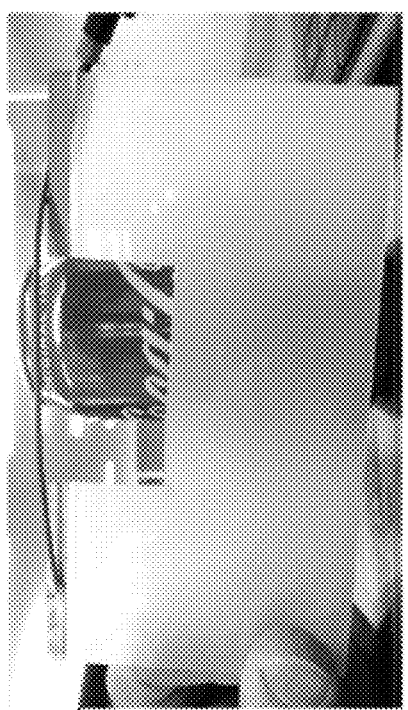
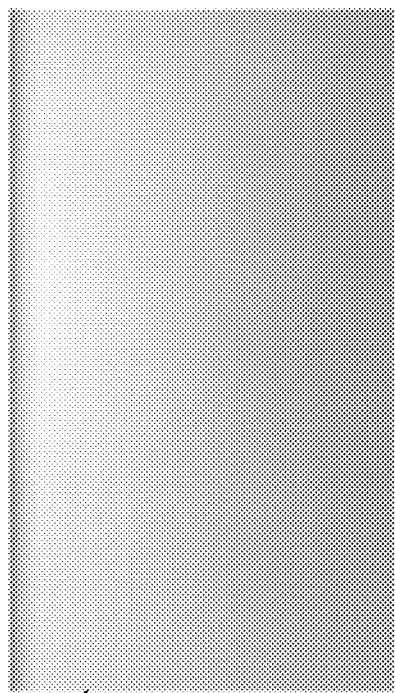
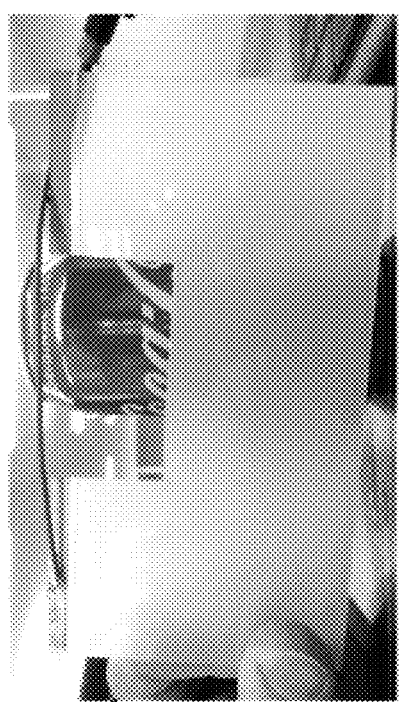
FIG. 7C
FIG. 7D

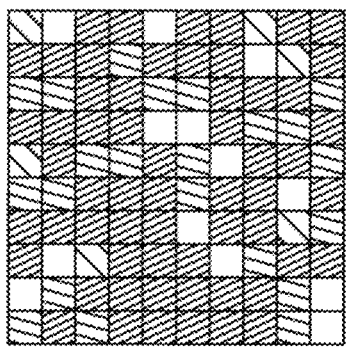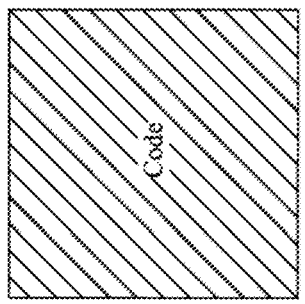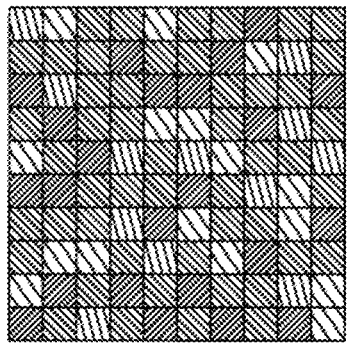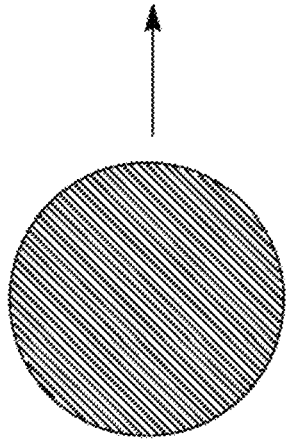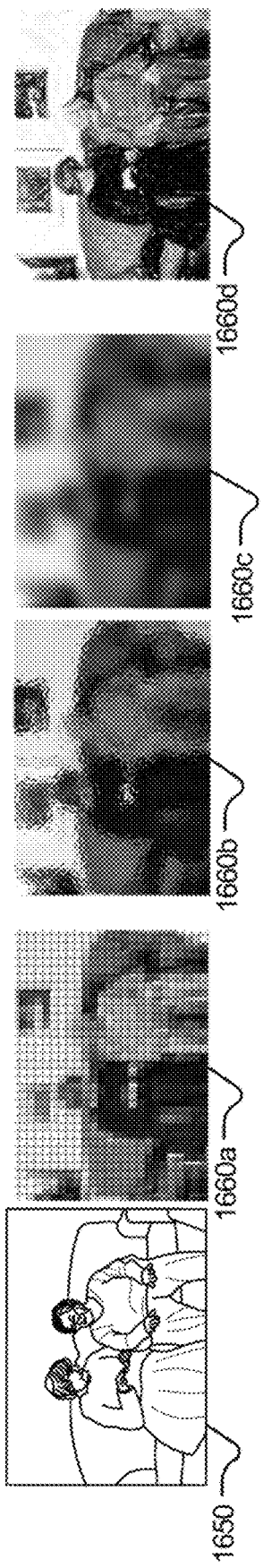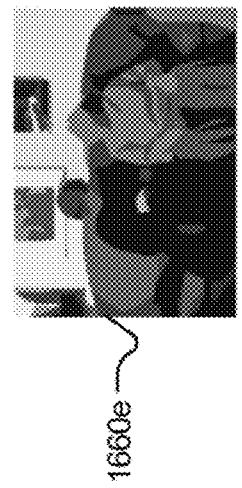
*FIG. 16A*
*FIG. 16B*

SYSTEMS AND METHODS FOR IMPLEMENTING PRIVACY FILTERS WITH VARIABLE OBFUSCATION FOR VIDEO COMMUNICATIONS

TECHNICAL FIELD

This disclosure relates generally to database and file management within network environments, and in particular relates to video communications.

BACKGROUND

Standard video call systems are commonplace. They have a fixed start time and end time, and during this period they transmit video and audio between participants (either which can be enabled or disabled). They are used frequently between friends, family members, business calls (one to one), business meetings (group), and presentations (one to many). There are many different platforms with different features tailored to the use case, e.g., replacing a person's video with an avatar on a friend-focused platform, applying noise suppression in a gaming focused platform, or applying a virtual background to enhance privacy in a business focused platform. Some new always-on video communication systems are emerging that aim to avoid the standard video call start and end structure. These systems are primarily aimed at collaborative workplaces with the goal of reducing barriers between coworkers communicating.

BRIEF DESCRIPTION OF THE DRAWINGS

FIGS. 7A, 7B, 7C and 7D illustrate example PDLC with four levels and their corresponding levels of obfuscation to a camera.

FIG. 16A illustrates an example flow diagram for applying a filter or transformation and/or overlay to a video stream.

FIG. 16B illustrates example applications of filters.

DESCRIPTION OF EXAMPLE EMBODIMENTS

Client System Overview

Figure 1:
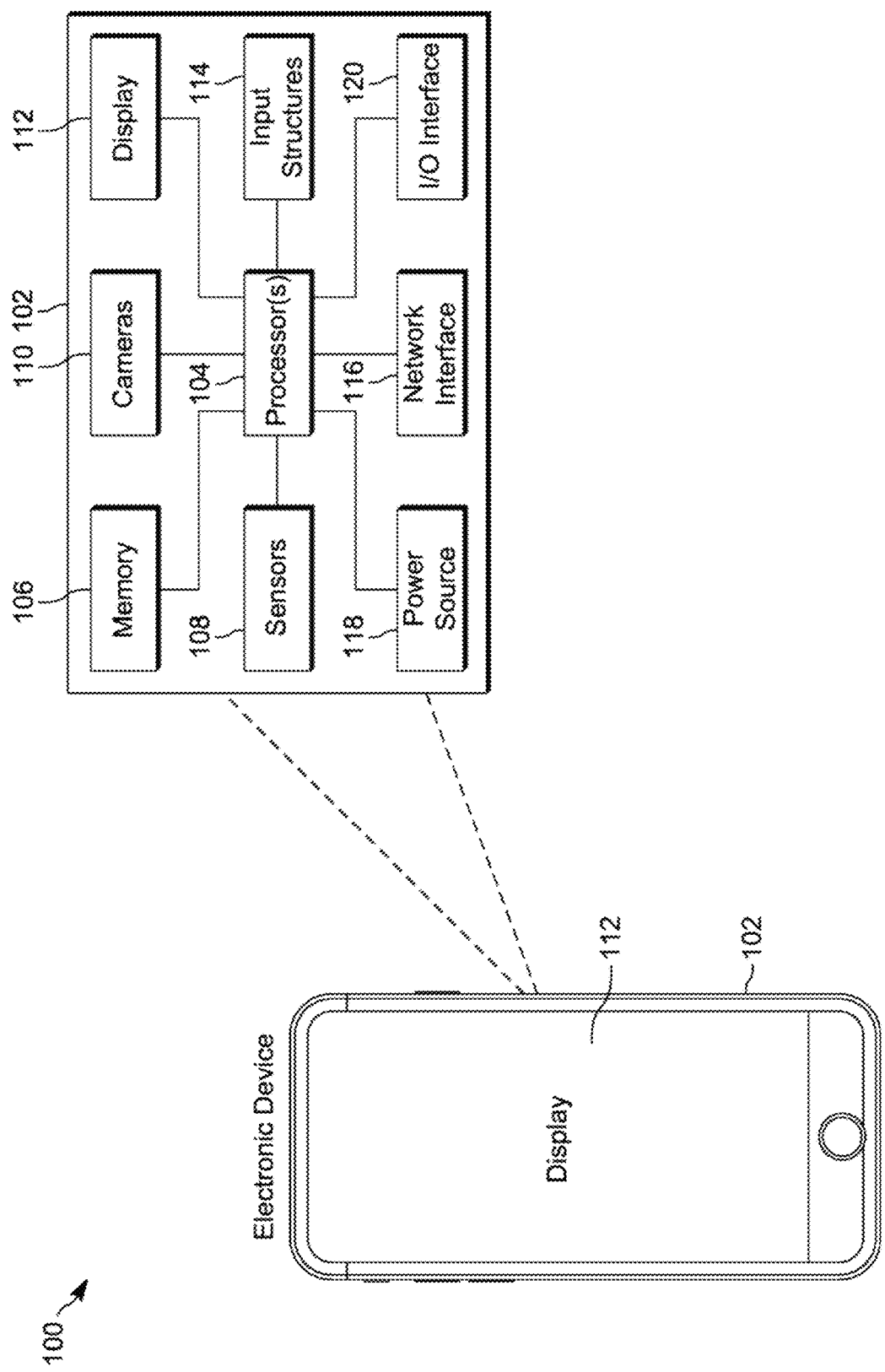
FIG. 1 illustrates an example electronic device.

FIG. 1 illustrates an example electronic device 100. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Implementing Privacy Filters with Variable Obfuscation for Video Communications

Existing video call systems (including always-on systems) focus primarily on full-engagement calls and may not provide suitable features for calls where participants may be less engaged. As a result, the participants may have limited privacy options. These options may be usually limited to merely "on" and "off" for the video and the audio. Existing systems may implement timers, fixed schedules, or accessible controls to specify when video and audio are "on" and "off". These features may not effectively address the privacy issues associated with low engagement video calls, such as users feeling as though they are being watched when at their desks but not interacting with anyone, inadvertently oversharing due to forgetting about the video call, etc. To address the aforementioned issues of existing systems, the embodiments disclosed herein may enable much greater flexibility in the level of information transmitted (and hence privacy) in video communications systems. The embodiments disclosed herein may be employed to significantly improve the always-on video call experience, or any other video communications where variable privacy is desired. In particular embodiments, a video communication system disclosed herein may include physical camera privacy filters that allow for variable obfuscation of the camera's view by physically moving one or more elements. The video communication system may also include physical camera privacy filters that allow for variable obfuscation of the camera's view with an element that can change transparency in response to electrical signals, wherein at least four different electrical signals may be applied to produce at least four corresponding levels of transparency. The video communication system may additionally provide presence visualizations, which may comprise visually appealing animations that convey basic activity or presence information between connected users without sharing video. In particular embodiments, the video communication system may also use a range of software-based video and audio obfuscation methods to further enhance the privacy for users.

In particular embodiments, the video communication system may maintain a video communication between two or more client devices. Each client device may comprise one or more cameras and each client device may be associated with a respective video stream in the video communication. In particular embodiments, the video communication system may determine scene data within a field of view in a real-world environment captured by one or more of the cameras of a first client device of the two or more client devices. The video communication system may then determine, based on the scene data, a privacy filter to apply to a first video stream associated with the first client device. The video communication system may further provide instructions to apply the privacy filter to the first video stream in the video communication.

Certain technical challenges exist for implementing privacy filters. One technical challenge may include using appropriate presence visualization as privacy filters. The solution presented by the embodiments disclosed herein to address this challenge may be determining privacy filters based on various data fields capturing participants' engagement with a video communication as such data fields are effective in evaluating how much privacy the participants may need during the video communication. Another technical challenge may include effectively determining activity level of users in a video communication. The solution presented by the embodiments disclosed herein to address this challenge may be detecting people within the field of view based on a person detection model, determining their poses based on a pose detection model, and determining the level of activity based on the poses as such progressing approach detects discriminating information at different stages that are helpful for determining the level of activity.

Certain embodiments disclosed herein may provide one or more technical advantages. A technical advantage of the embodiments may include significantly improving the always-on video call experience, or any other video communications where variable privacy is desired by using various techniques including physical camera privacy filters that allow for variable obfuscation, presence visualizations, and software-based obfuscation methods. Another technical advantage of the embodiments may include clear visibility of the level of obfuscation to users by using physical camera privacy filters as the users can see particularly element (e.g., partially opaque element) in front of the camera to expect that camera's view may not be clear. Another technical advantage of the embodiments may include interpretable user engagement even with privacy filters as the presence visualization may have different patterns indicating different level of engagement. Certain embodiments disclosed herein may provide none, some, or all of the above technical advantages. One or more other technical advantages may be readily apparent to one skilled in the art in view of the figures, descriptions, and claims of the present disclosure.

Figure 2:
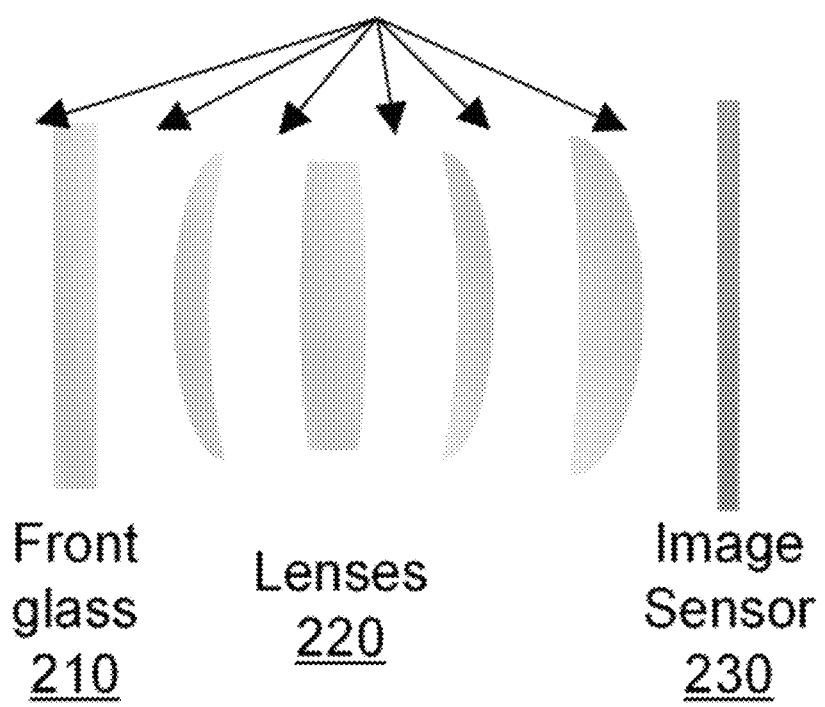
FIG. 2 illustrates example locations of the physical camera privacy filters.

In particular embodiments, the privacy filter may be a physical camera privacy filter comprising one or more of a movable element with transparency gradient, a semi-transparent layer, a movable patterned element with transparency gradient, a displacement of lenses associated with a camera, or two or more sheets with polarizing filters. The physical camera privacy filters may be elements that physically move within the camera's optical path, which may be used to adjust the clarity of the camera's view and hence provide privacy. FIG. 2 illustrates example locations 200 of the physical camera privacy filters. The physical camera privacy filters may be located in front of the camera (e.g., front glass 210), in front of the image sensor 230, or anywhere in between (e.g., lenses 220).

Figure 3:
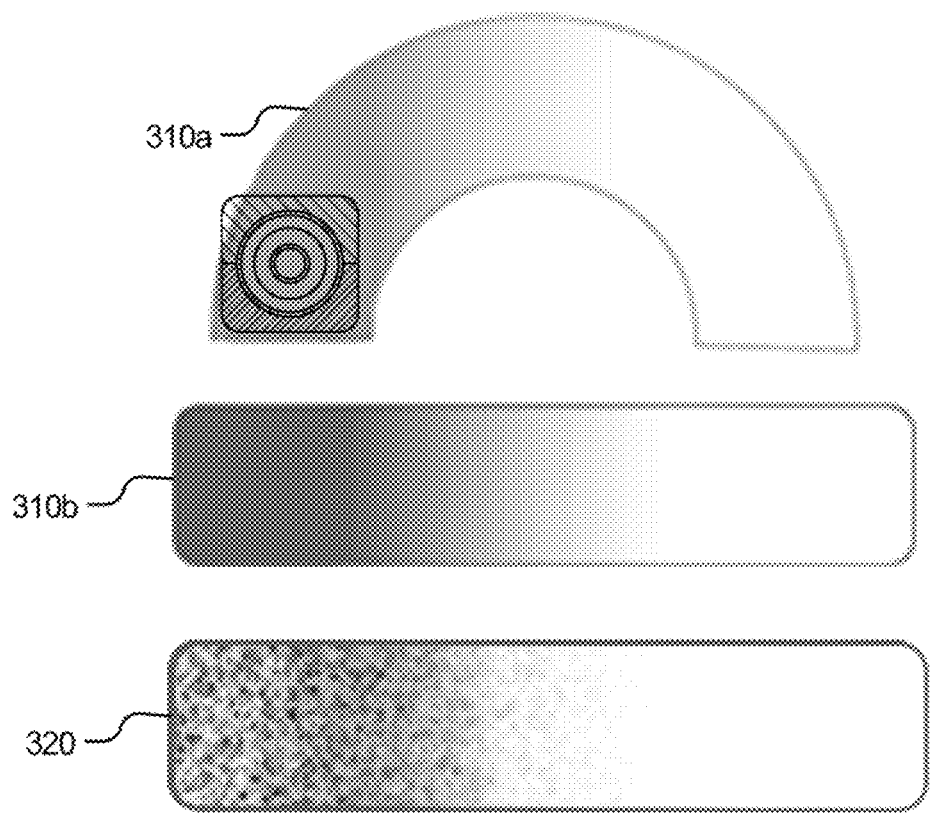
FIG. 3 illustrates example moving elements with transparency gradient.

In particular embodiments, the physical camera privacy filter may comprise a moving element with transparency gradient. FIG. 3 illustrates example moving elements 310/320 with transparency gradient. The element 310/320 may be transparent at one end, opaque at the other end. The element 310/320 may have a transparency gradient between the two ends. In particular embodiments, the element 320 with the transparency gradient may be textured or patterned in order to apply a desired visual appearance to the camera's view. The element 310/320 may physically move in front of the camera to obscure the view to some degree. The element 310/320 may be moved by hand, spring, electromechanical actuator, or other method.

Figure 4:
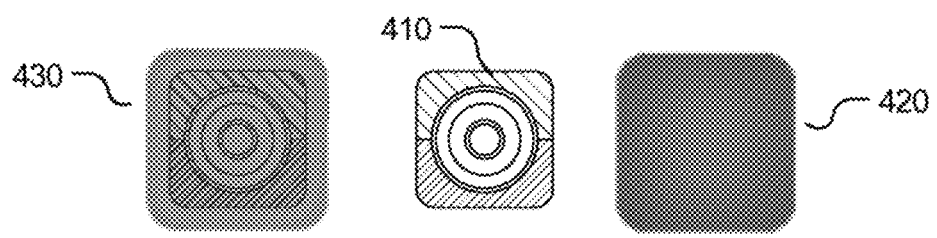
FIG. 4 illustrates an example permanent privacy filter.

In particular embodiments, a video communication device associated with the video communication system may have multiple cameras, with one camera being permanently obfuscated to some degree. The method of obfuscated may be a semi-transparent layer in front of the lens or lenses that result in the camera being out of focus. The non-obfuscated camera may be covered entirely when privacy is desired, such that the device may only see through the obfuscated camera. FIG. 4 illustrates an example permanent privacy filter. The camera 410 may have a semi-transparent layer 420 that may result in the obfuscation 430.

Figure 5:
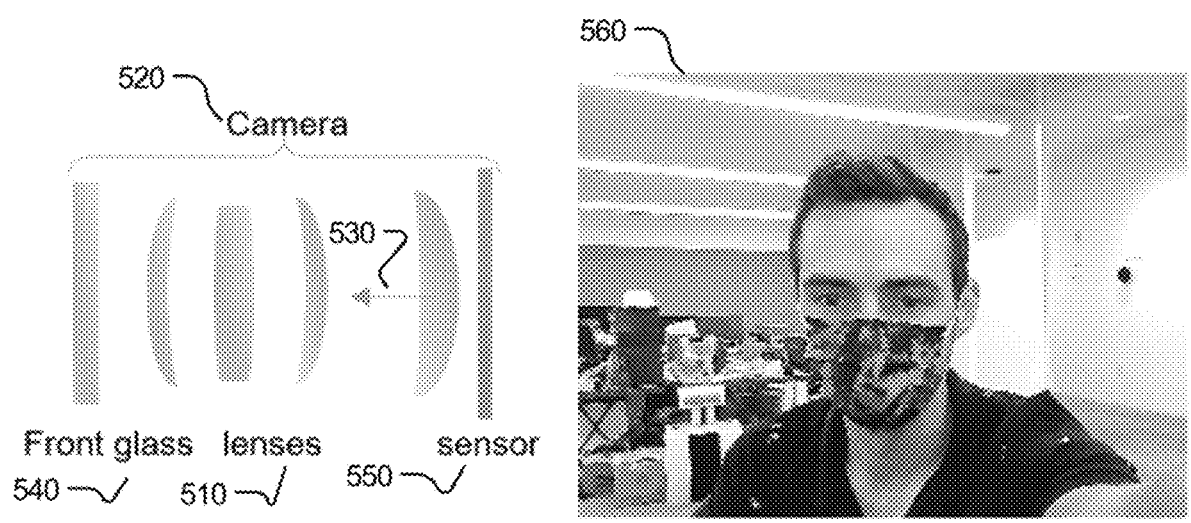
FIG. 5 illustrates an example displacement and a corresponding image.

In particular embodiments, one or more camera lenses may be displaced out of the usual range to force the camera view out of focus, such that the camera is unable to refocus. This may result in a blurring and/or warping of the image. The lens(es) may be moved by hand, spring, electromechanical actuator, or other method. The displacement direction may be along the optical axis, or normal to the optical axis. FIG. 5 illustrates an example displacement and a corresponding image. The lenses 510 of the camera 520 may displace along the direction 530 between the front glass 540 and the sensor 550. When displacement occurs, the corresponding image 560 may be out of focus.

Figure 6:
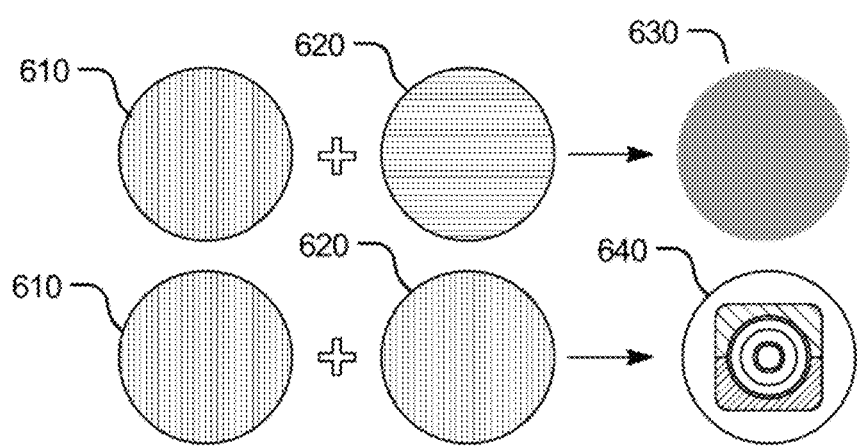
FIG. 6 illustrates example polarizing filters.

In particular embodiments, two sheets with polarizing filters may be mounted in front of the camera. One of the sheets may be rotated to control the transparency of the camera's view. When the polarizing direction of the two sheets are aligned, the camera's view is clear. As the polarizing direction of the two sheets approaches 90 degrees, the filters may approach 0% transparency. FIG. 6 illustrates example polarizing filters. When the polarizing direction of sheet 610 and that of sheet 620 is 90 degrees, the filters may have no transparency 630. When the polarizing direction of sheet 610 and that of sheet 620 is aligned, the filters may have complete transparency 640. By using physical camera privacy filters, the embodiments disclosed herein may have a technical advantage of clear visibility of the level of obfuscation to users as the users can see particularly element (e.g., partially opaque element) in front of the camera to expect that camera's view may not be clear.

In particular embodiments, the privacy filter may be a physical element placed in an optical path associated with a camera. The physical element may be operable to change its transparency to at least four different transparency levels. The privacy filter may be an electrically controlled, variable transparency camera privacy filter. An element could be placed in the camera's optical path that is able to change its transparency in response to an electrical signal. The obfuscation of the camera's view could then be altered as desired via electronic control. The control will allow for a minimum of four different steps of transparency levels. The elements may be located in front of the camera, in front of the image sensor, or anywhere in between. In particular embodiments, the element may be based on one or more of polymer dispersed liquid crystal (PDLC), polymer stabilized liquid crystal (PSLC), electrochromic, electrophoresis, electrowetting, or smectic A (SmA) liquid crystal. Polymer dispersed liquid crystal may comprise liquid crystal (LC) droplets surrounded by a polymer mixture where the concentration of both is about equal between two pieces of conducting glass or plastic. An applied electric field may align the LC to create transparent region on command. Absence of electric field may result in random LC orientation opaque appearance. For polymer stabilized liquid crystal, the concentration of polymer may be less than 10% of the liquid crystals. Adding the polymers to a liquid crystal to may form a phase-separated PSLC mixture that creates differently oriented domains of the liquid crystal, and it may scatter light from those domains, and the size of those domains determines the intensity of scattering. Electrochromic material may change its opacity between a translucent state (usually blue) and a transparent state due to the electrochemical redox reactions that takes place in electrochromic materials in response to voltage and thus allowing control over the amount of light passing through. Electrowetting may comprise modification of the wetting properties of a surface with an applied electric field, which may allow an opaque material to selectively block light passing. The bistable smectic a liquid crystal may work by creating or erasing a dense field of light-scattering focal conic domains. Applying a low frequency electric field, the LC may convert to a turbulent light-scattering state. Applying high frequency electric field, homeotropic (HT) texture may be generated because of the dielectric re-orientation of the smectic A LC.

Figure 7A:
Figure 7A:
Figure 7B:
Figure 7B:
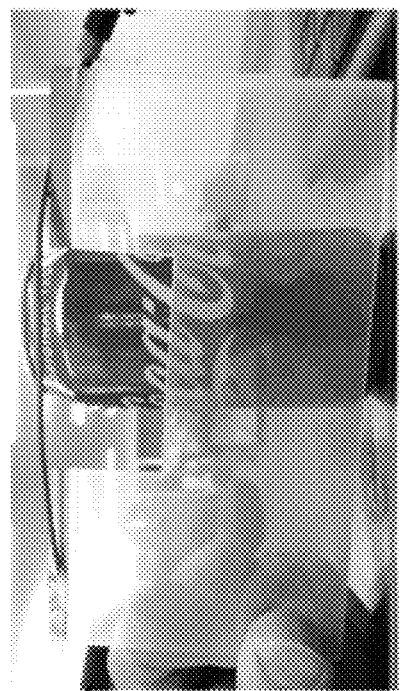

FIGS. 7A, 7B, 7C and 7D illustrate example PDLC with four levels and their corresponding levels of obfuscation to a camera. FIG. 7A illustrates an example PDLC with a first level 710 and a corresponding level of obfuscation to the camera 715. FIG. 7B illustrates an example PDLC with a second level 720 and a corresponding level of obfuscation to the camera 725. FIG. 7C illustrates an example PDLC with a third level 730 and a corresponding level of obfuscation to the camera 735. FIG. 7D illustrates an example PDLC with a fourth level 740 and a corresponding level of obfuscation to the camera 745.

In particular embodiments, the privacy filter may be a presence visualization based on one or more of a shape, a motion, a shade, or an animation. Presence visualization may have elements that may change in response to certain data fields of the users who are in the video communication. However, presence visualizations may not present the camera stream. Instead, they may be intended to convey a sense of presence between users when high levels of privacy are desired, in a visually appealing manner. In particular embodiments, the scene data may comprise one or more of a level of activity, a sound in the real-world environment, a presence of a person within the field of view, an absence of a person within the field of view, a location of the real-world environment, an engagement of a person with respect to the video communication, a facial expression of a person within the field of view, a gesture of a person within the field of view, a pose of a person within the field of view, a time at the real-world environment, or weather at the real-world environment. Determining privacy filters based on various data fields capturing participants' engagement with a video communication may be an effective solution to address the technical challenge of using appropriate presence visualization as privacy filters as such data fields are effective in evaluating how much privacy the participants may need during the video communication. In particular embodiments, the aforementioned data fields may be obtained from a range of sensors, which may include but are not limited to camera(s), microphone(s), lidar sensor which uses lasers to perform many distance measurements at a rapid rate to provide a point cloud (usually too sparse to resolve any fine details) in the three-dimensional (3D) space, radar (uses much longer wavelengths than lidar) which emits and receives radar waves to produce depth maps with very low levels of detail, ultrasound sensor which uses acoustic waves to measure the distance to objects, event camera (a.k.a. dynamic vision sensor) which is an optical camera that reports only changes in brightness on a per-pixel basis but cannot capture images, infrared sensors which passively sense infrared energy as people are usually higher temperature than the environment and can be detected by their increase in infrared energy. In particular embodiments, non-camera sensors may be advantageous as they may continue to function if a user has physically covered the camera.

Figure 8:
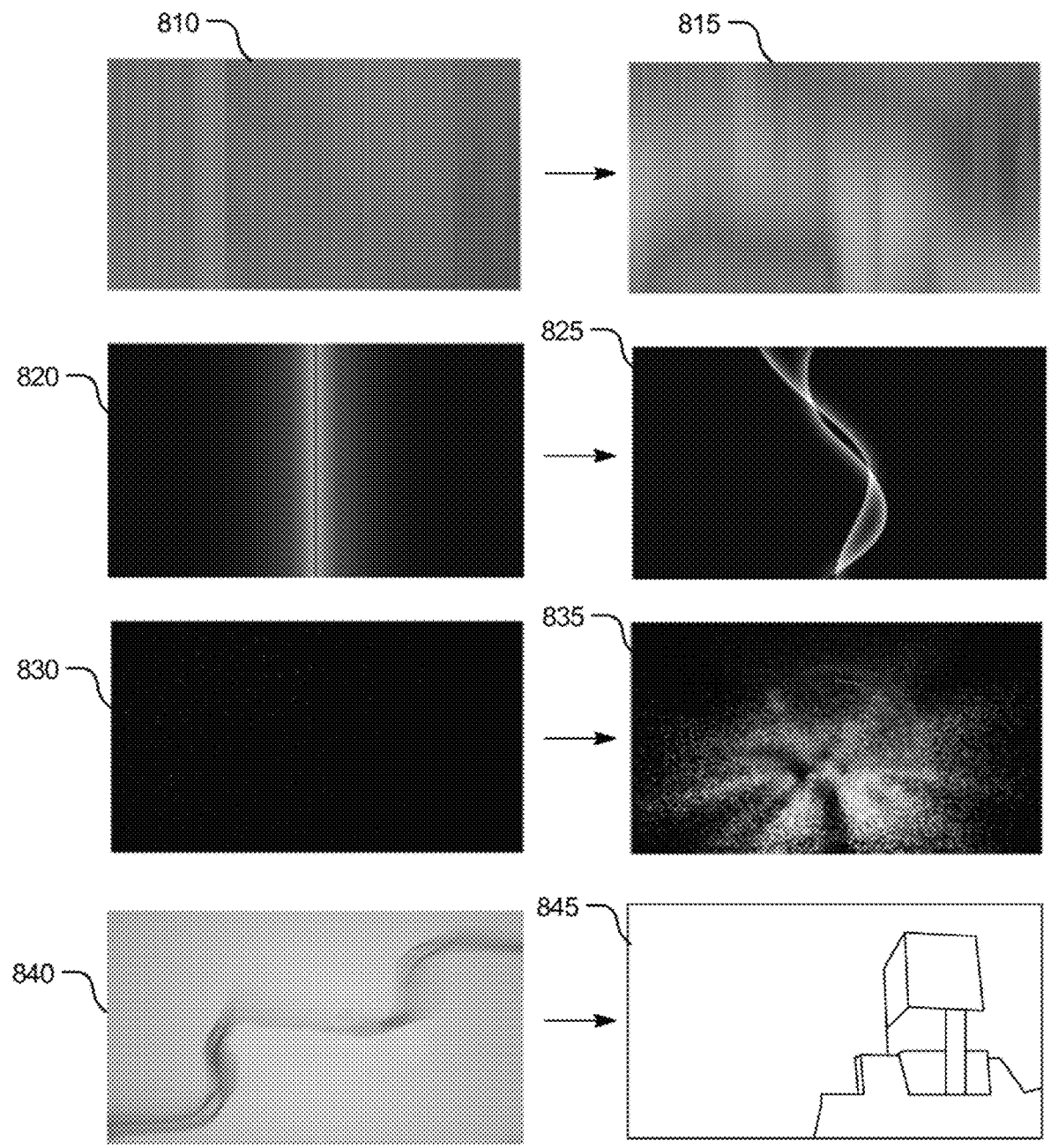
FIG. 8 illustrates example presence visualizations.
Figure 9A:
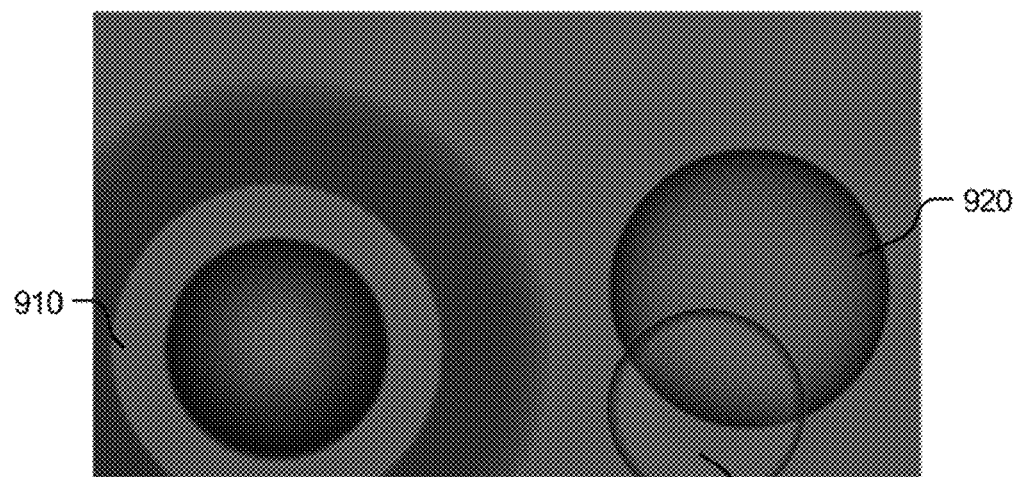
FIGS. 9A-9C illustrate another example presence visualization.
Figure 9B:
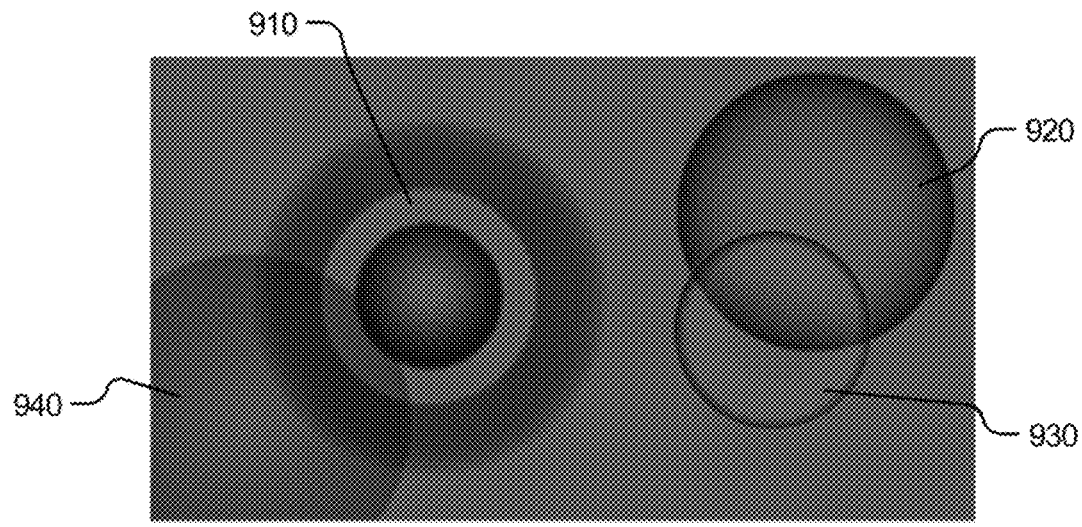
Figure 9C:
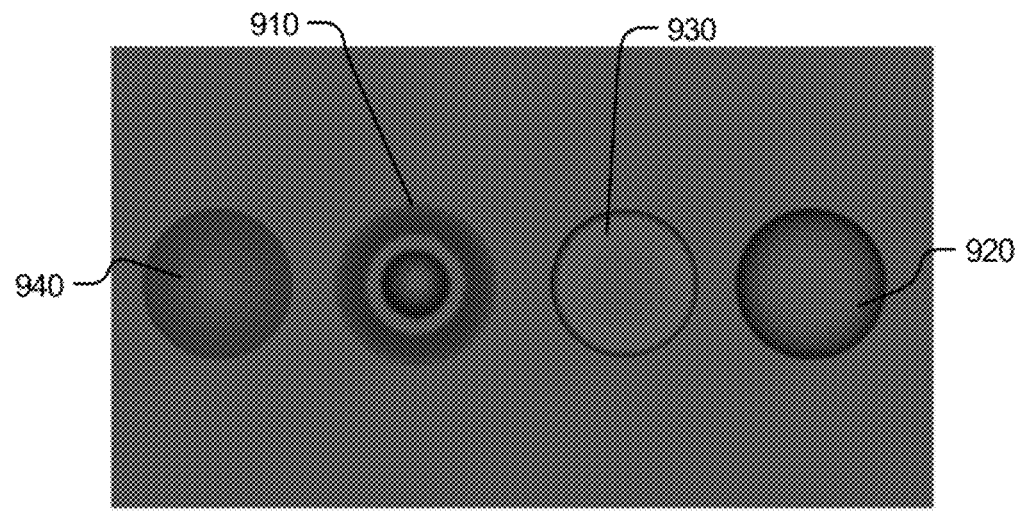

In particular embodiments, presence visualizations may be generated using one or more methods within the fields of two-dimensional (2D) graphics, 3D graphics, VFX (i.e., parallax effect), and others. FIG. 8 illustrates example presence visualizations. Visualizations similar to the aurora borealis are generated. The color tone, detail and locations of the lights may change to represent the presence of a person. A certain area and a certain color may correspond to each user. If activity or movement is detected, the animation may become more dynamic and attention-grabbing. To be more specific, visualizations 810, 820, 830, and 840 may indicate that persons or activity are not detected whereas visualizations 815, 825, 835, and 845 may indicate that persons or activity are detected. FIGS. 9A-9C illustrate another example presence visualization. The presence visualization may represent each user as a circle. FIG. 9A illustrates presence visualization of three users 910-930. FIG. 9B illustrates presence visualization of four users 910-940. The color, size and glowing effect may change in response to the presence and activity level of each user. FIG. 9C illustrates presence visualization based on activity levels. For example, users 920 and 940 may be both passive.

Figure 10:
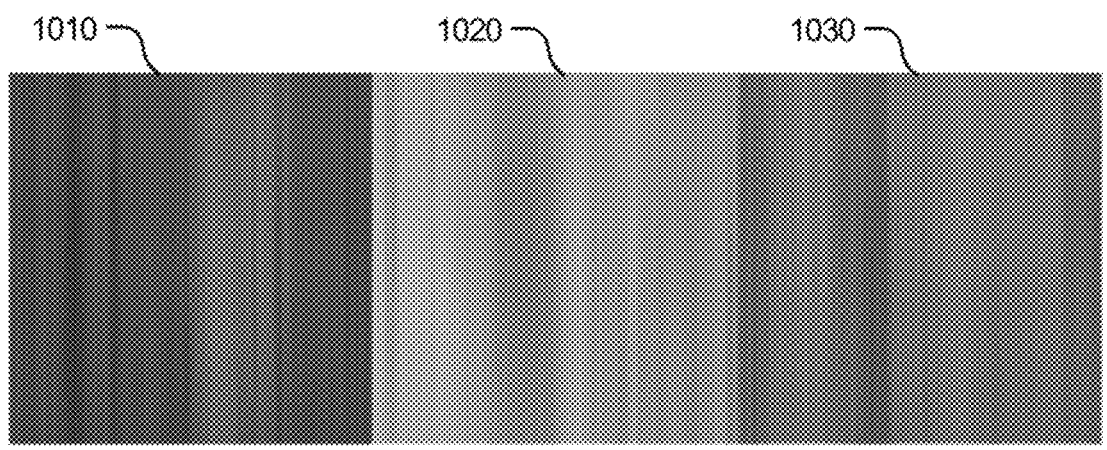
FIG. 10 illustrates example presence visualizations for three users.
Figure 11:
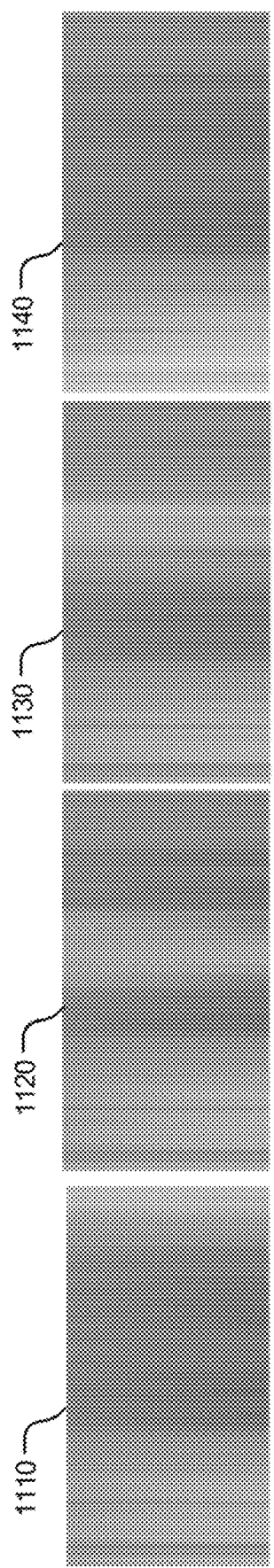
FIG. 11 illustrates example behavior for a presence visualization for one user.

In particular embodiments, the presence visualization may be a passive visualization. As an example and not by way of limitation, the presence visualization may be similar to the appearance of curtains. The presence visualization may comprise one section to represent each connected client device. FIG. 10 illustrates example presence visualizations for three users. Presence visualizations 1010-1030 may represent three client devices, respectively. From each connected device, the video communication system may receive data about the locations of any detected persons as well as their activity level. This data may be then used to animate the visualization. When a connected device reports a person location, a corresponding area of the visualization may be shaded in a dynamic and abstract shape. When the reported person location moves, the shaded area may move correspondingly. The person's activity level may determine how prevalent, dynamic, and attention-grabbing the shaded area is. FIG. 11 illustrates example behavior for a presence visualization for one user. Presence visualization 1110 may display no shaded area as the received data indicates that no persons are detected. Presence visualization 1120 may display a subtle animation as the received data indicates unchanging person location. Presence visualization 1130 may display more dynamic motion as the received data indicates that the person is active. Presence visualization 1140 may display shaded area moves as the received data indicates that the person location is moving across the frame. The embodiments disclosed herein may have another technical advantage of interpretable user engagement even with privacy filters as the presence visualization may have different patterns indicating different level of engagement.

Figure 12:
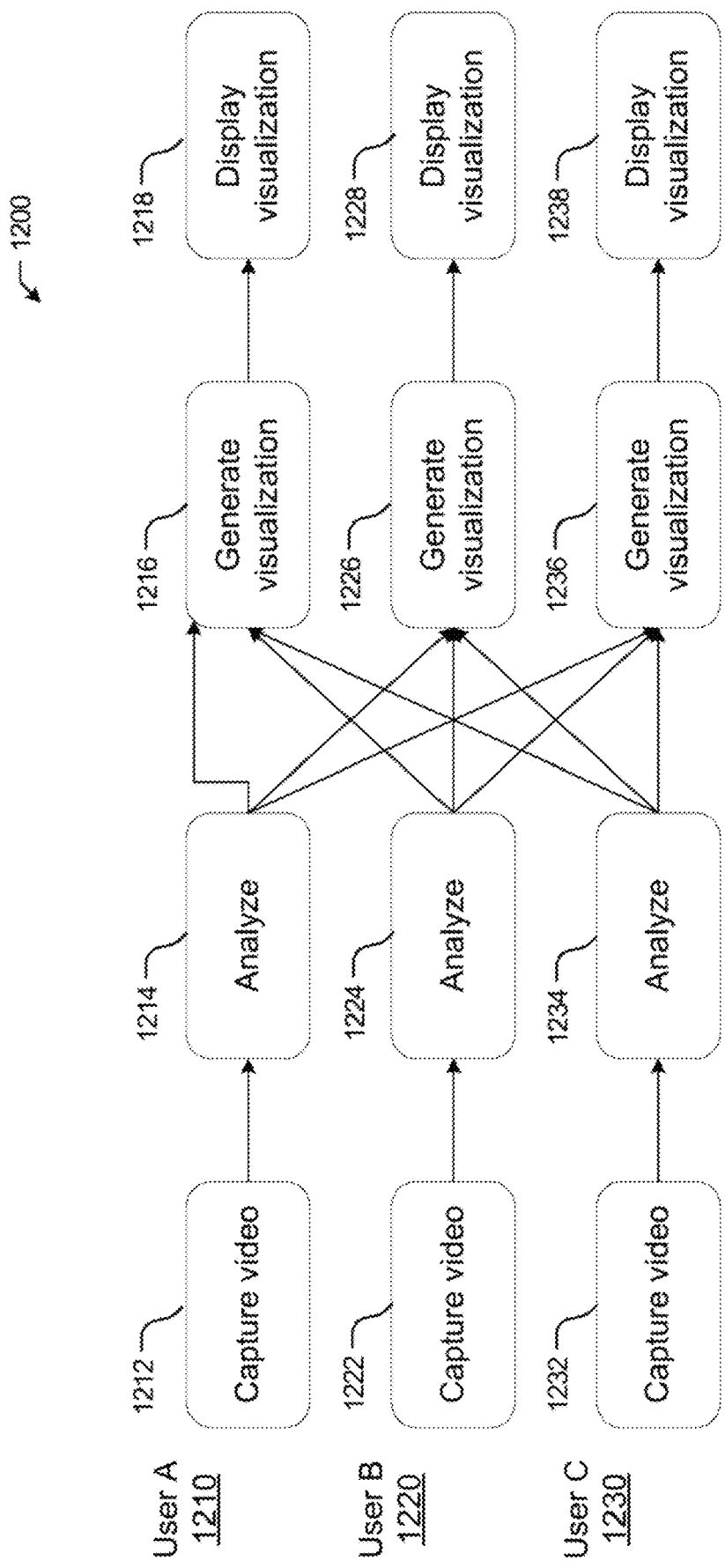
FIG. 12 illustrates an example block diagram for presence visualization.
Figure 13:
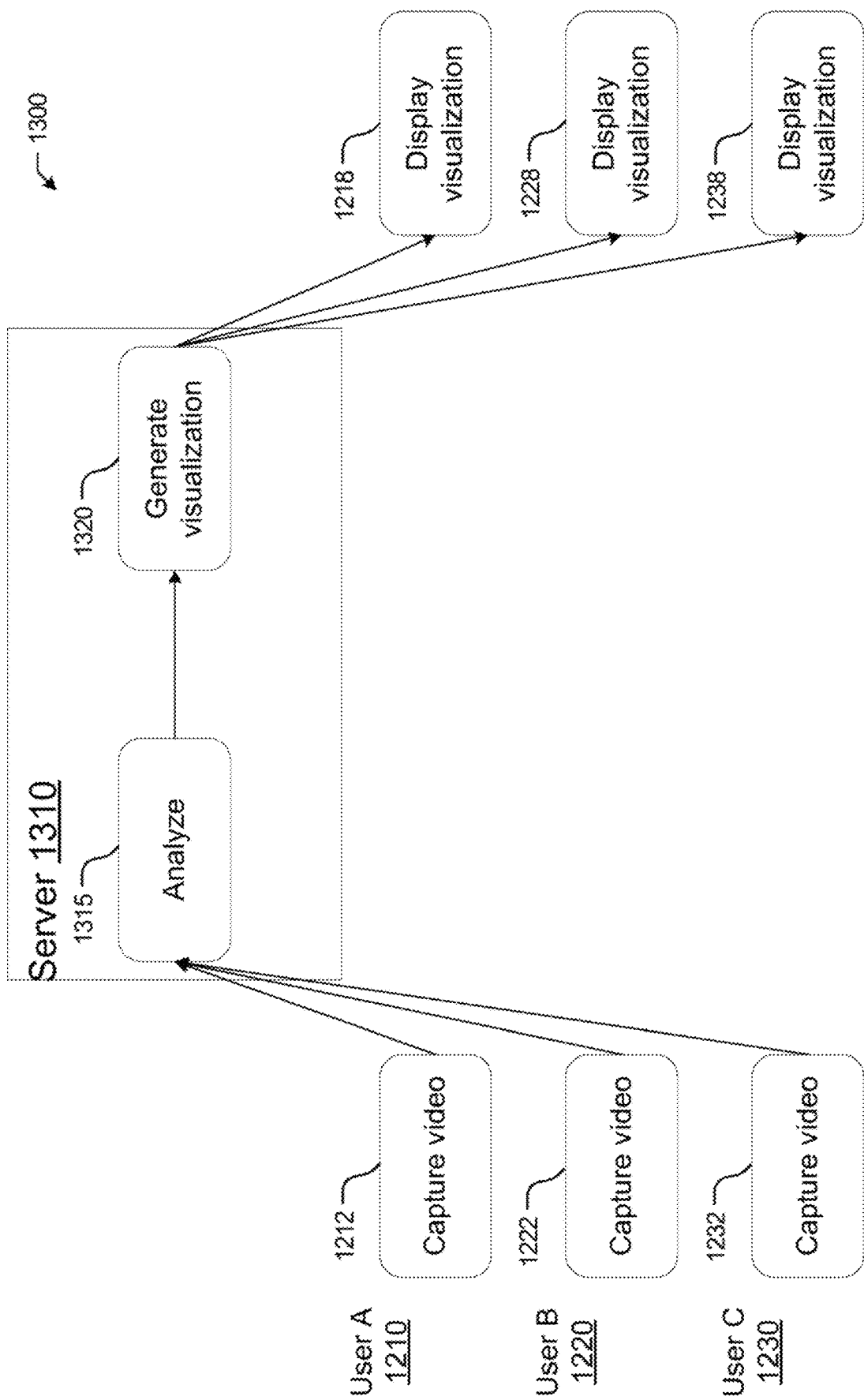
FIG. 13 illustrates another example block diagram for presence visualization.

FIG. 12 illustrates an example block diagram 1200 for presence visualization. As an example implementation, assume that multiple users (users A 1210, B 1220, and C 1230) are connected via the video communication system who have all indicated that they want a high level of privacy. At step 1212, user A's 1210 camera may capture a video stream. At step 1214, the video communication system may analyze the captured video stream to determine a small number of outputs, e.g., the number of people in view, their approximate locations, and their activity level. The same analysis may be performed for user B 1220 through step 1222 to step 1224 and for user C 1230 through step 1232 to step 1234. The analysis outputs may be shared between all connected client devices. At step 1216, step 1226, or step 1236, the video communication system may generate a visualization that represents some or all of the analysis outputs that were generated. At step 1218, step 1228, or step 1238, the video communication system may display the visualization to each user. In the example block diagram 1200, the analysis and visualization generation may be performed locally on each client device. FIG. 13 illustrates another example block diagram 1300 for presence visualization. Different from the block diagram 1200, in this block diagram 1300, analysis 1315 and visualization generation 1320 are performed on a server 1310. An advantage of this approach may be that less processing power is required at each client device.

Figure 14:
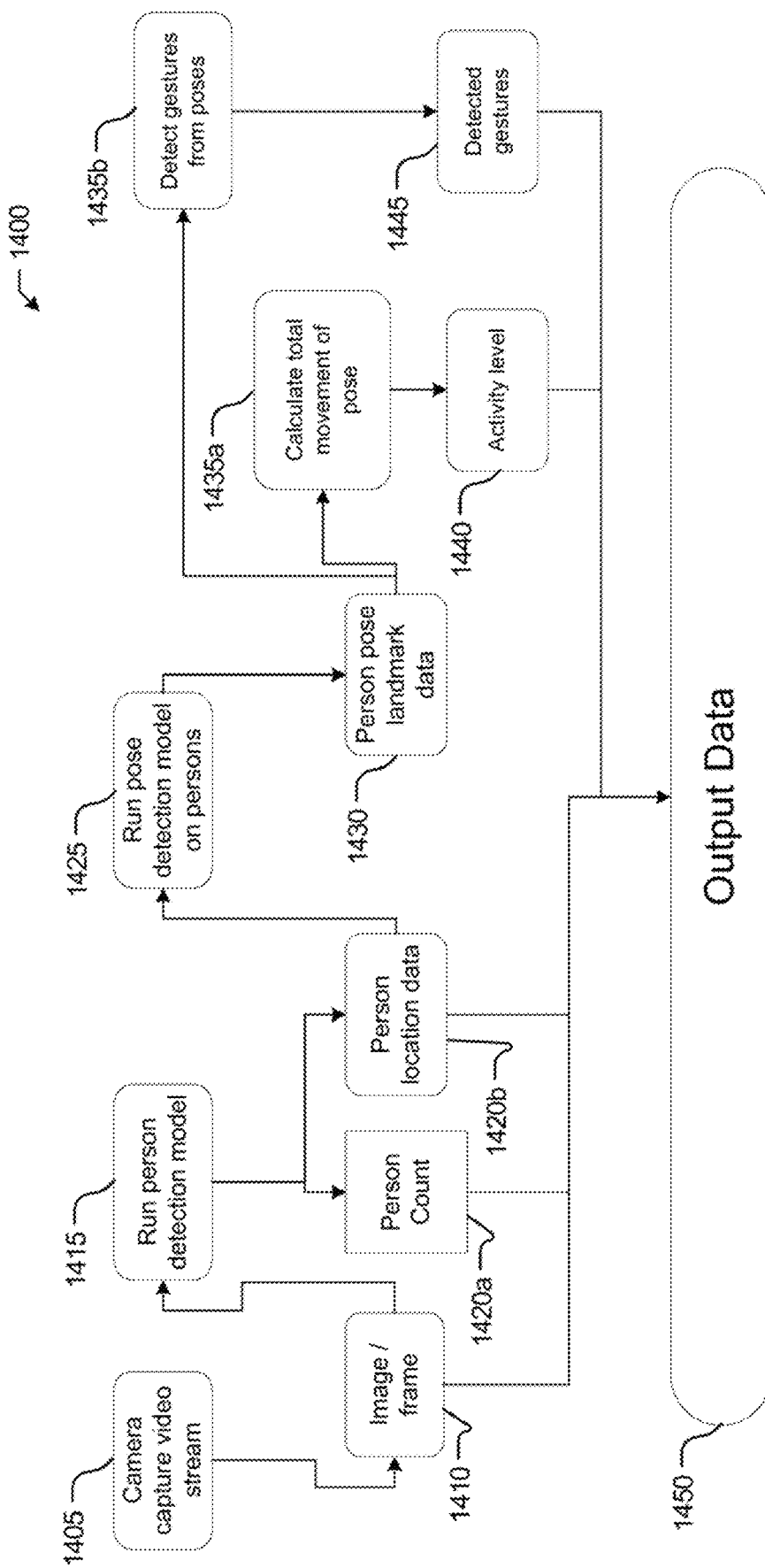
FIG. 14 illustrates an example block diagram for analyzing video streams.

In particular embodiments, the video communication system may analyze the captured video stream (e.g., steps 1214/1224/1234 in the block diagram 1200 and step 1315 in the block diagram 1300) by processing a given video stream to extract data fields. As an example and not by way of limitation, such data fields may include, but are not limited to, person activity level, presence or absence of persons, locations of persons, poses of persons, and gestures. In particular embodiments, the video communication system may detect, based on a person detection model, one or more people within the field of view. The video communication system may then determine, based on a pose detection model, one or more poses of one or more of the detected people. The video communication system may further determine the scene data based on the determined poses of one or more of the detected people. FIG. 14 illustrates an example block diagram 1400 for analyzing video streams. At step 1405, the camera may capture a video stream. At step 1410, the video communication system may extract an image or frame. At step 1415, the video communication system may run a person detection model. At step 1420a, the video communication system may determine the person count. At step 1420b, the video communication system may determine the person location data. At step 1425, the video communication system may run a pose detection model on persons. At step 1430, the video communication system may generate person pose landmark data. At step 1435a, the video communication system may calculate total movement of pose. At step 1440, the video communication system may determine the activity level. At step 1435b, the video communication system may detect gestures from poses. At step

1445, the video communication system may obtain the detected gestures. At step 1450, the video communication system may generate the output data which may comprise the image or frame, the person count, the person location data, the activity level, and the detected gestures. Detecting people within the field of view based on a person detection model, determining their poses based on a pose detection model, and determining the level of activity based on the poses may be an effective solution for addressing the technical challenge of effectively determining activity level of users in a video communication as such progressing approach detects discriminating information at different stages that are helpful for determining the level of activity.

Figures 15A, 15B:
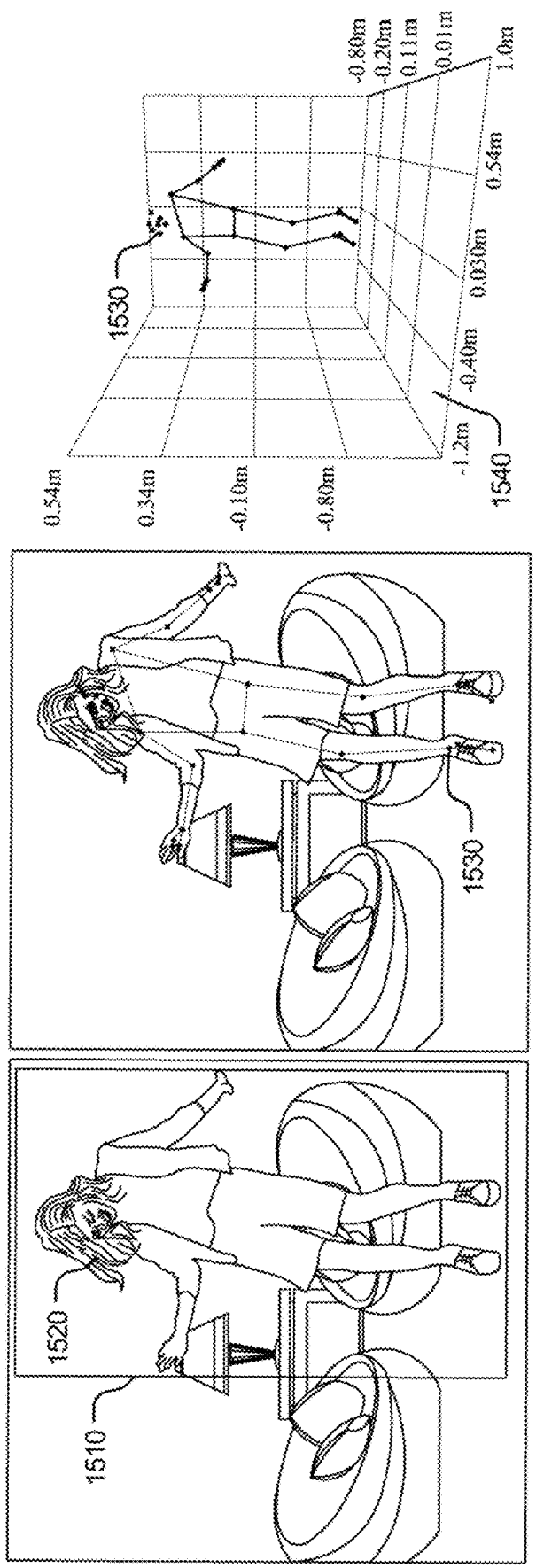
FIG. 15A illustrates an example detection of a person.
FIG. 15B illustrates example locations of the person's limbs and joints as landmarks in 3D coordinates.

As previously described, the video communication system may run a person detection model. Human detection is a common task in computer vision applications. Many models exist to achieve this, most of which may be based on neural networks and output a rectangle around each detected person. FIG. 15A illustrates an example detection of a person. A rectangle 1510 is around the person 1520. When running the pose detection model, the video communication system may determine the locations of the person's limbs and joints, usually as a collection of landmarks 1530 in either 2D or 3D coordinates. FIG. 15B illustrates example locations of the person's limbs and joints as landmarks in 3D coordinates 1540. In particular embodiments, the person detection model and the pose detection model may be combined in a single model. After the human poses are known, the video communication system may detect gestures by analyzing the limb and joint positions. As an example and not by way of limitation, a raised arm may be detected if the angle from the shoulder to the elbow is within 20 degrees of vertically "up" and the elbow joint is within 20 degrees of "straight".

Figure 17A:
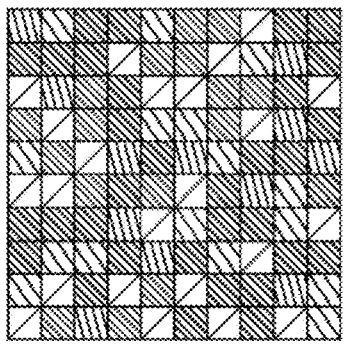
FIG. 17A illustrates an example flow diagram for using the camera's focus system to intentionally defocus the camera.
Figure 17A:
Figure 17A:
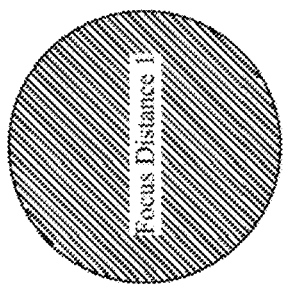
Figure 17A:
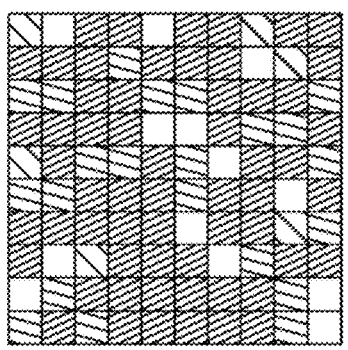
Figure 17A:
Figure 17A:
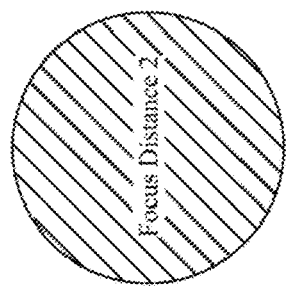
Figure 17B:
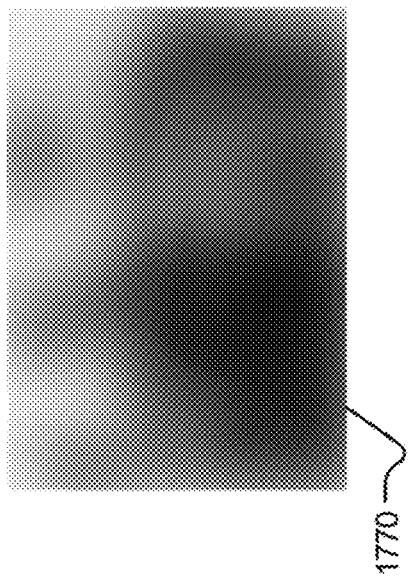
FIG. 17B illustrates example defocused images.
Figure 17B:
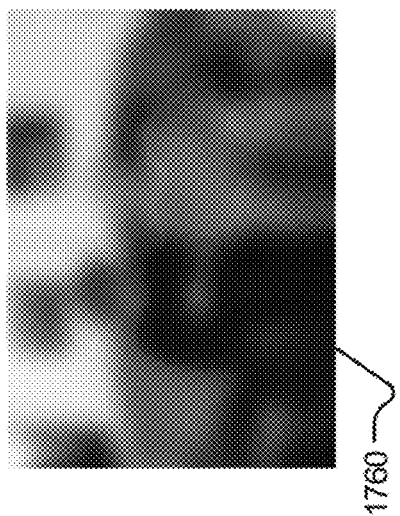
Figure 17B:
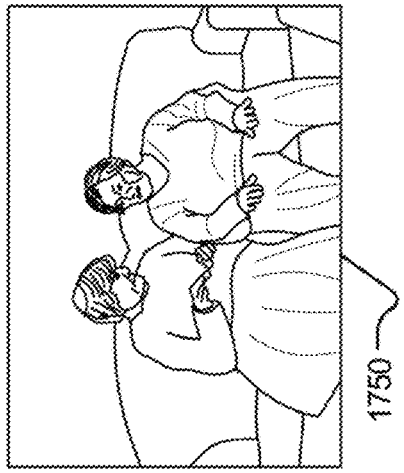
Figure 18A:
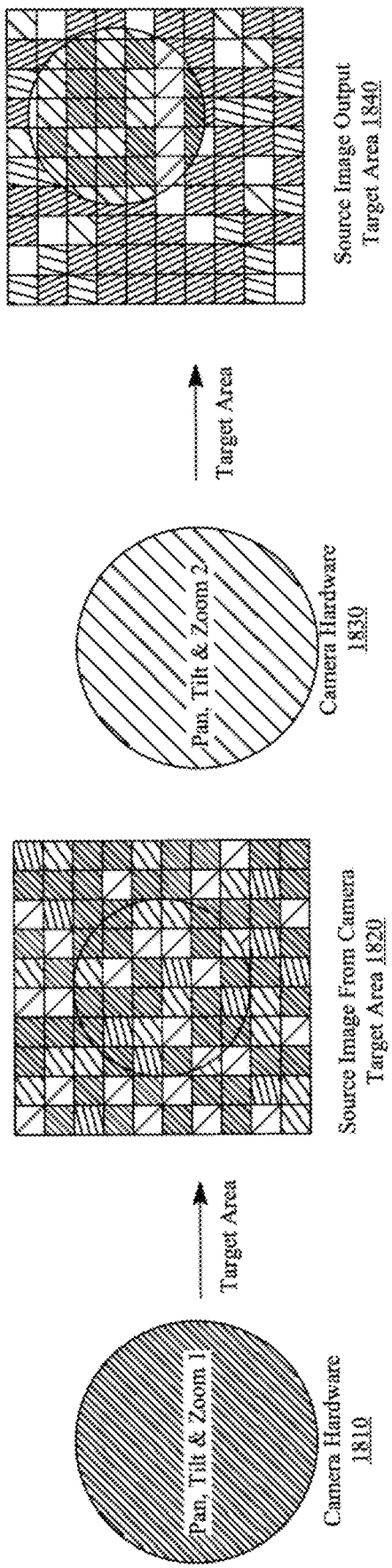
FIG. 18A illustrates an example flow diagram for panning, tilting, and zooming a video stream.
Figure 18B:
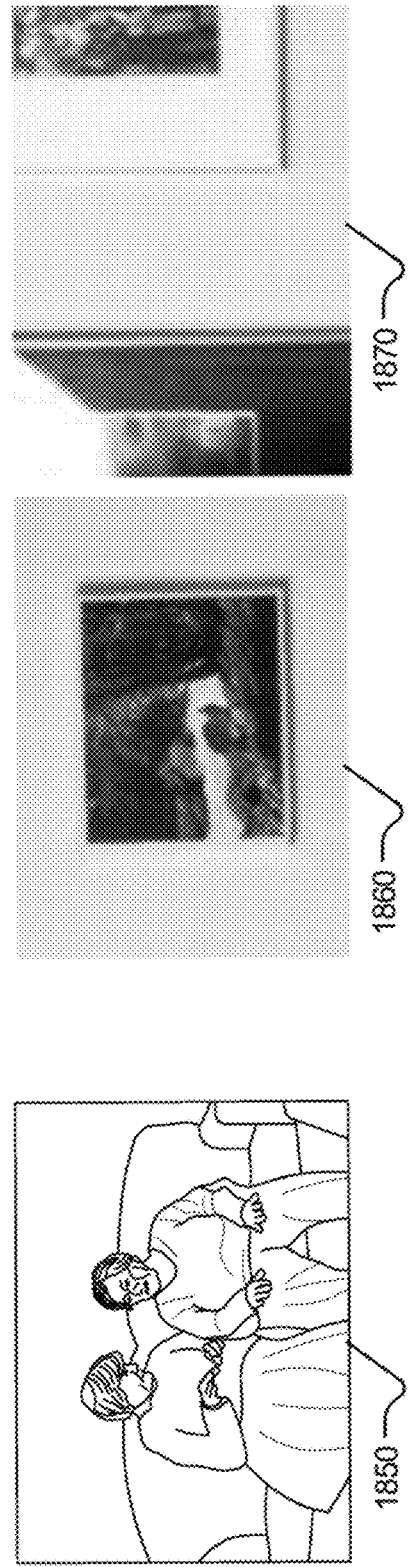
FIG. 18B illustrates example panned, tilted, or zoomed images.
Figure 19A:
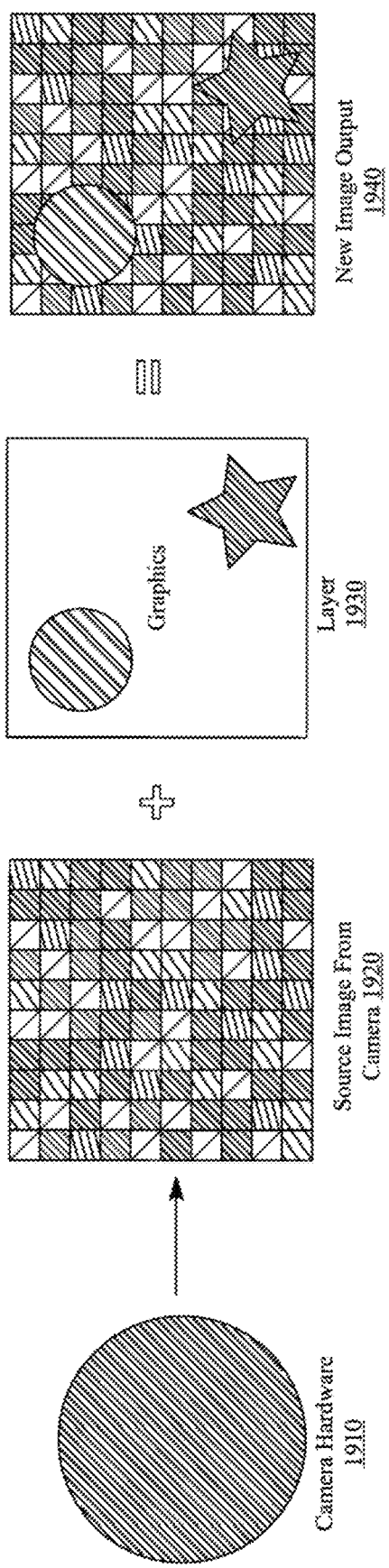
FIG. 19A illustrates an example flow diagram for replacing a user with an avatar.
Figure 19B:
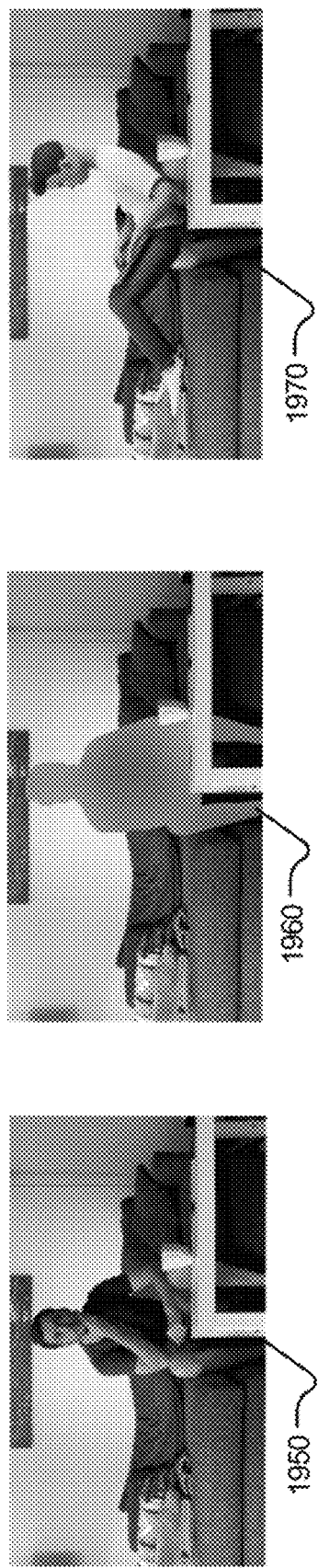
FIG. 19B illustrates an example image with a replacement of an avatar.
Figure 20A:
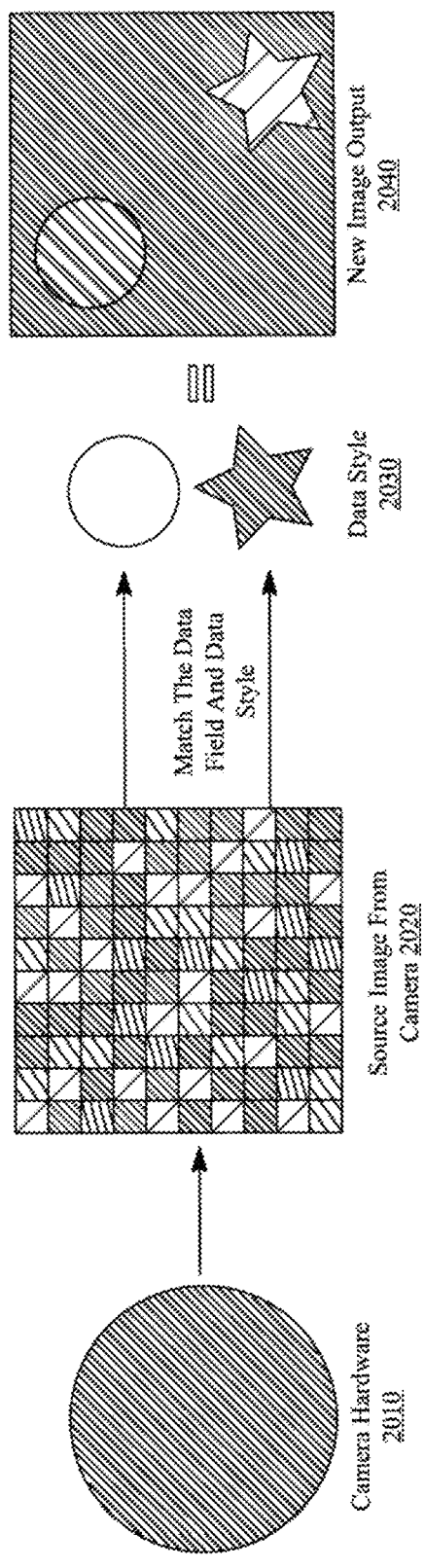
FIG. 20A illustrates an example flow diagram for replacing the entire video with a virtual representation.
Figure 20B:
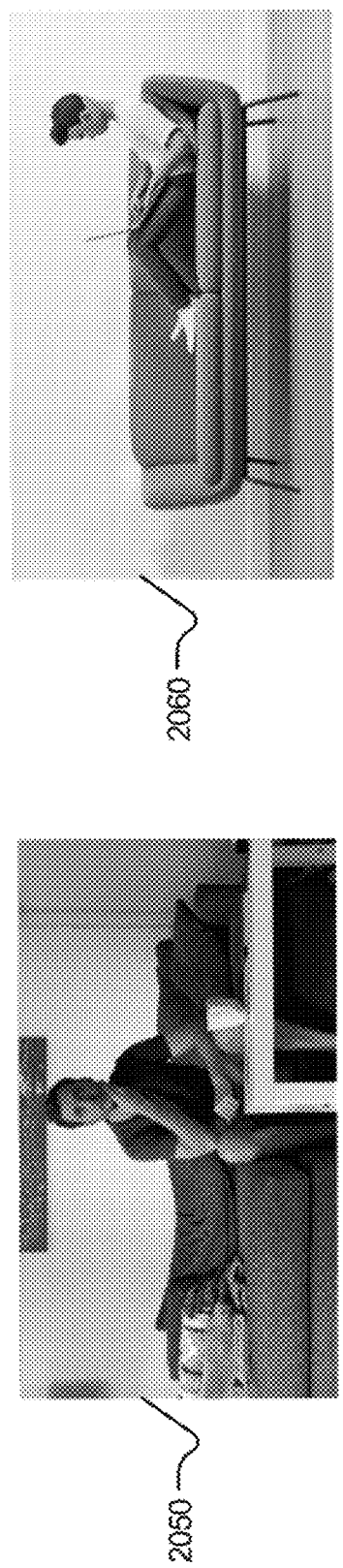
FIG. 20B illustrates an example image with a virtual replacement.

In alternative embodiments, the video communication system may additionally or alternatively use one or more software-based video obfuscation methods to provide flexible control over the amount of information transmitted via the video stream. In particular embodiments, applying the privacy filter results in an obfuscation of the field of view based on one or more of a transformation of the field of view, an overlay to the field of view, a manipulation of the one or more of the cameras to obfuscate the field of view, or a partial or complete replacement of the first video stream with one or more virtual elements. In one embodiment, the video communication system may apply a filter or transformation and/or overlay to the video stream. Examples may include, but not limited to, gaussian blur, vertical/horizontal blur, motion blur, mosaic effects, pixilation, hue change, saturation change, etc. Any filter, transformation or artistic effect may be applied. FIG. 16A illustrates an example flow diagram for applying a filter or transformation and/or overlay to a video stream. The video communication system may use camera hardware 1610 to get source image from camera 1620. The video communication system may then apply a function 1630 to generate the new image output 1640. FIG. 16B illustrates example applications of filters. Image 1650 may be the original image. Image 1660a-1660e may indicate the applications of different example filters. In another embodiment, the video communication system may manipulate the camera to intentionally obfuscate the view. FIG. 17A illustrates an example flow diagram for using the camera's focus system to intentionally defocus the camera. The video communication system may use camera hardware 1710 with a first focus distance to generate a source image output 1720. The video communication system may use camera hardware with a second focus distance 1730 to generate another source image output 1740. FIG. 17B illustrates example defocused images. Image 1750 may be the original image. Image 1760 may indicate the application of a first focus distance. Image 1770 may indicate the application of a second focus distance. FIG. 18A illustrates an example flow diagram for panning, tilting, and zooming a video stream. The video communication may pan and/or crop the video stream to an unimportant view (which may intentionally avoid the users). The video communication system may use camera hardware 1810 with a first pan, tilt and zoom to generate a source image output 1820 at the target area. The video communication system may use camera hardware with a second pan, tilt and zoom 1830 to generate another source image output 1840 at the target area. FIG. 18B illustrates example panned, tilted, or zoomed images. Image 1850 may be the original image. Image 1860 may indicate the application of a first pan, tilt and zoom. Image 1870 may indicate the application of a second pan, tilt and zoom. In yet another embodiment, the video communication system may replace some or all video stream with virtual elements, such as an avatar. FIG. 19A illustrates an example flow diagram for replacing a user with an avatar. The video communication system may use camera hardware 1910 to get source image from camera 1920. The video communication system may then apply a layer 1930 to generate the new image output 1940. FIG. 19B illustrates an example image with a replacement of an avatar. Image 1950 may be the original image. Image 1960 may be the image where the subject is removed. Image 1970 may be the image where the avatar is added to replace the subject. FIG. 20A illustrates an example flow diagram for replacing the entire video with a virtual representation. The video communication system may use camera hardware 2010 to get source image from camera 2020. The video communication system may then match the data fields and data style 2030 to generate the new image output 2040. FIG. 20B illustrates an example image with a virtual replacement. Image 2050 may be the original image. Image 2060 may be the image where there is a virtual replacement for the entire image.

In alternative embodiments, the video communication system may additionally or alternatively use audio obfuscation methods. Always-on video calls may also benefit from flexible control over the information transmitted between devices via the audio. Existing system may only allow for muting and volume control. The video communication system disclosed herein may have the ability to obfuscate the audio such that it conveys some audio activity yet does not transmit comprehensible voice. This mode may maintain some connection between users (as desired by always-on video), without inadvertently transmitting private conversations or audio that may be a nuisance to the recipient. As an example and not by way of limitation, modifications that may be applied to the audio to achieve this effect may be, but not limited to, reducing the amplitude (volume), applying a low-pass filter, applying reverberation which adds an echo effect to the audio and may both obfuscate the audio and convey a sense of distance.

Figure 21:
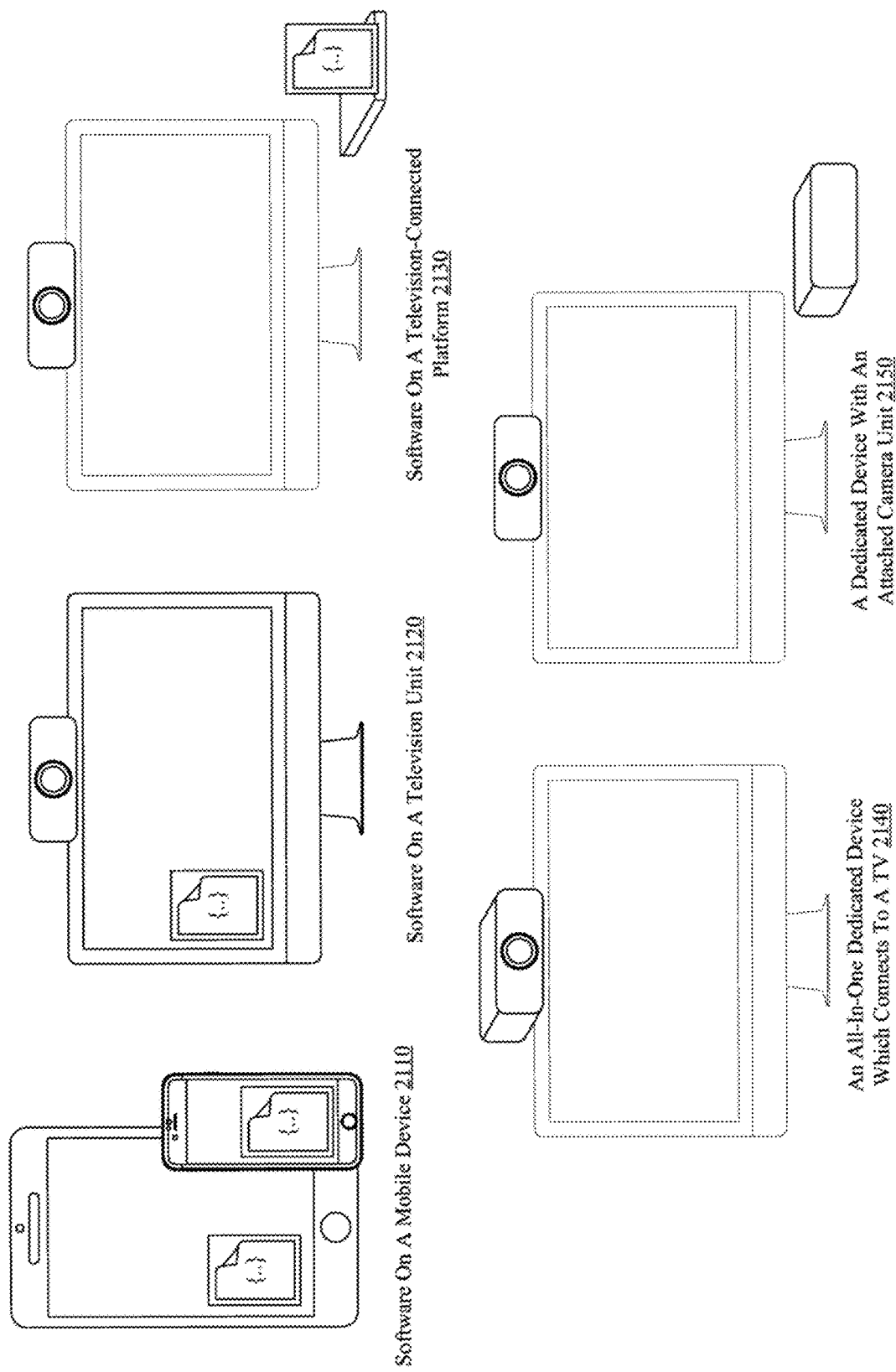
FIG. 21 illustrates example applications of privacy filters.

FIG. 21 illustrates example applications of privacy filters. The privacy filters described herein may be applied on any device that supports video communication. Such devices may have a range of form factors. Options may include, but not limited to, software on a mobile device 2110, software on a television unit 2120 optionally with an attached camera unit, software on a television-connected platform 2130 optionally with an attached camera unit, an all-in-one dedicated device which connects to a TV 2140, a dedicated device with an attached camera unit 2150, etc. The embodiments disclosed herein may have a technical advantage of significantly improving the always-on video call experience, or any other video communications where variable privacy is desired by using various techniques including physical camera privacy filters that allow for variable obfuscation, presence visualizations, and software-based obfuscation methods.

Figure 22:
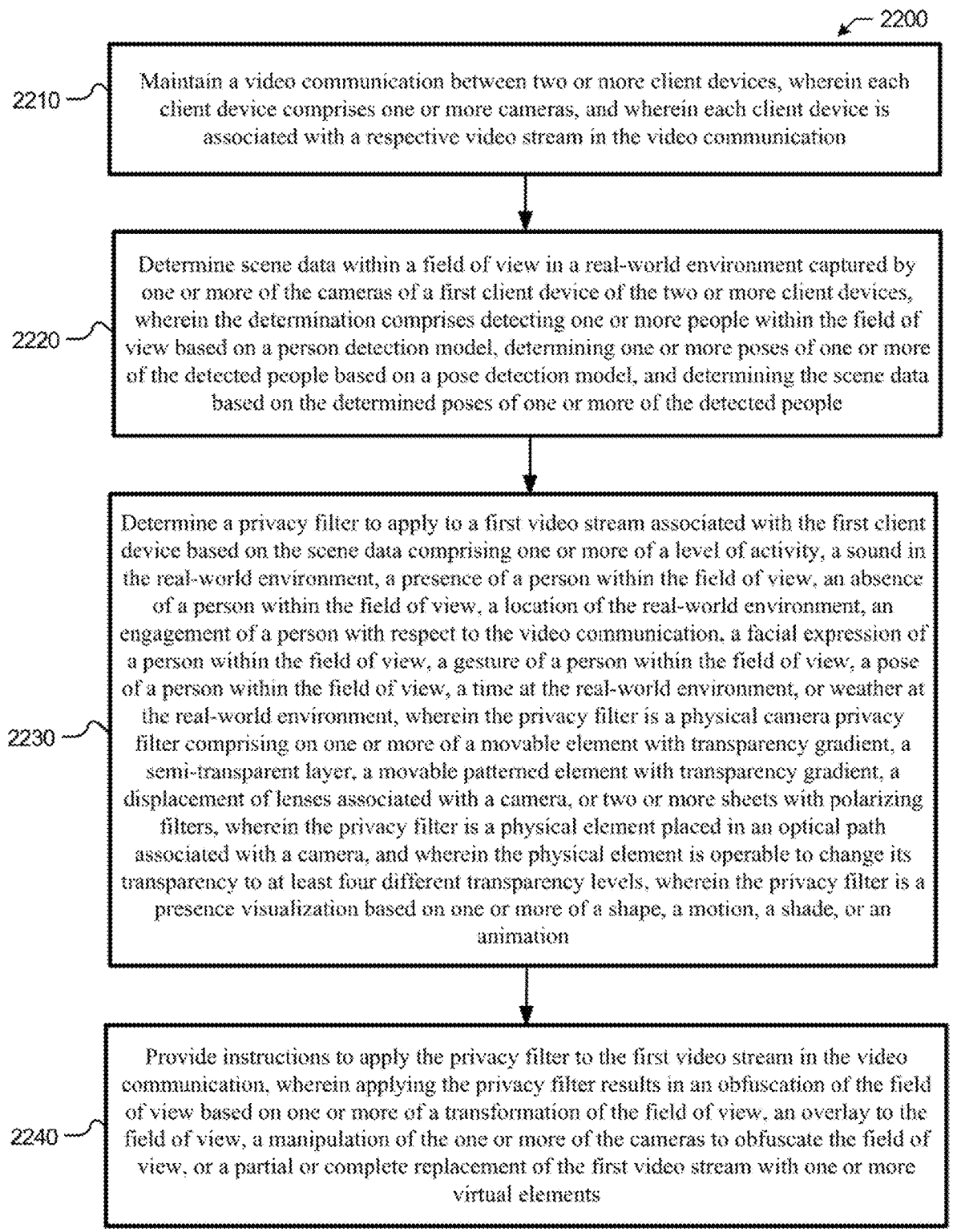
FIG. 22 illustrates is a flow diagram of a method for implementing privacy filters, in accordance with the presently disclosed embodiments.

FIG. 22 illustrates is a flow diagram of a method 2200 for implementing privacy filters, in accordance with the presently disclosed embodiments. The method 2200 may be performed utilizing one or more processing devices (e.g., the electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 2200 may begin at step 2210 with the one or more processing devices (e.g., the electronic device 100). For example, in particular embodiments, the electronic device 100 may maintain a video communication between two or more client devices, wherein each client device comprises one or more cameras, and wherein each client device is associated with a respective video stream in the video communication. The method 2200 may then continue at step 2220 with the one or more processing devices (e.g., the electronic device 100). For example, in particular embodiments, the electronic device 100 may determine scene data within a field of view in a real-world environment captured by one or more of the cameras of a first client device of the two or more client devices, wherein the determination comprises detecting one or more people within the field of view based on a person detection model, determining one or more poses of one or more of the detected people based on a pose detection model, and determining the scene data based on the determined poses of one or more of the detected people. The method 2200 may then continue at step 2230 with the one or more processing devices (e.g., the electronic device 100). For example, in particular embodiments, the electronic device 100 may determine a privacy filter to apply to a first video stream associated with the first client device based on the scene data comprising one or more of a level of activity, a sound in the real-world environment, a presence of a person within the field of view, an absence of a person within the field of view, a location of the real-world environment, an engagement of a person with respect to the video communication, a facial expression of a person within the field of view, a gesture of a person within the field of view, a pose of a person within the field of view, a time at the real-world environment, or weather at the real-world environment, wherein the privacy filter is a physical camera privacy filter comprising one or more of a movable element with transparency gradient, a semi-transparent layer, a movable patterned element with transparency gradient, a displacement of lenses associated with a camera, or two or more sheets with polarizing filters, wherein the privacy filter is a physical element placed in an optical path associated with a camera, and wherein the physical element is operable to change its transparency to at least four different transparency levels, wherein the privacy filter is a presence visualization based on one or more of a shape, a motion, a shade, or an animation. The method 2200 may then continue at block 2240 with the one or more processing devices (e.g., the electronic device 100). For example, in particular embodiments, the electronic device 100 may provide instructions to apply the privacy filter to the first video stream in the video communication, wherein applying the privacy filter results in an obfuscation of the field of view based on one or more of a transformation of the field of view, an overlay to the field of view, a manipulation of the one or more of the cameras to obfuscate the field of view, or a partial or complete replacement of the first video stream with one or more virtual elements. Particular embodiments may repeat one or more steps of the method of FIG. 22, where appropriate. Although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates an example method for implementing privacy filters including the particular steps of the method of FIG. 22, this disclosure contemplates any suitable method for implementing privacy filters including any suitable steps, which may include all, some, or none of the steps of the method of FIG. 22, where appropriate. Furthermore, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Systems and Methods

Figure 23:
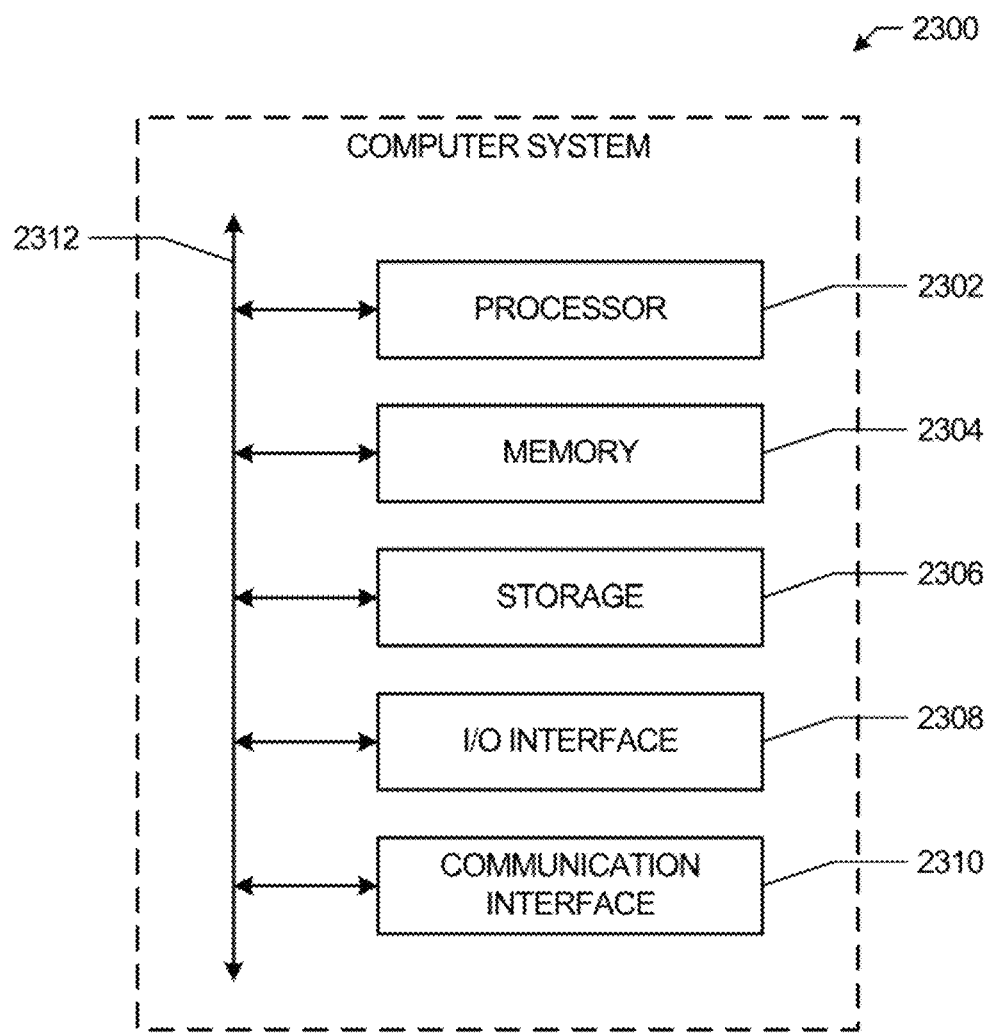
FIG. 23 illustrates an example computer system.

FIG. 23 illustrates an example computer system 2300 that may be utilized to perform implementing privacy filters, in accordance with the presently disclosed embodiments. In particular embodiments, one or more computer systems 2300 perform one or more steps of one or more methods described or illustrated herein. In particular embodiments, one or more computer systems 2300 provide functionality described or illustrated herein. In particular embodiments, software running on one or more computer systems 2300 performs one or more steps of one or more methods described or illustrated herein or provides functionality described or illustrated herein. Particular embodiments include one or more portions of one or more computer systems 2300. Herein, reference to a computer system may encompass a computing device, and vice versa, where appropriate. Moreover, reference to a computer system may encompass one or more computer systems, where appropriate.

This disclosure contemplates any suitable number of computer systems 2300. This disclosure contemplates computer system 2300 taking any suitable physical form. As example and not by way of limitation, computer system 2300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2300 may include one or more computer systems 2300; be unitary or distributed; span multiple locations; span multiple machines; span multiple data centers; or reside in a cloud, which may include one or more cloud components in one or more networks.

Where appropriate, one or more computer systems 2300 may perform without substantial spatial or temporal limitation one or more steps of one or more methods described or illustrated herein. As an example, and not by way of limitation, one or more computer systems 2300 may perform in real time or in batch mode one or more steps of one or more methods described or illustrated herein. One or more computer systems 2300 may perform at different times or at different locations one or more steps of one or more methods described or illustrated herein, where appropriate.

In particular embodiments, computer system 2300 includes a processor 2302, memory 2304, storage 2306, an input/output (I/O) interface 2308, a communication interface 2310, and a bus 2312. Although this disclosure describes and illustrates a particular computer system having a particular number of particular components in a particular arrangement, this disclosure contemplates any suitable computer system having any suitable number of any suitable components in any suitable arrangement. In particular embodiments, processor 2302 includes hardware for executing instructions, such as those making up a computer program. As an example, and not by way of limitation, to execute instructions, processor 2302 may retrieve (or fetch) the instructions from an internal register, an internal cache, memory 2304, or storage 2306; decode and execute them; and then write one or more results to an internal register, an internal cache, memory 2304, or storage 2306. In particular embodiments, processor 2302 may include one or more internal caches for data, instructions, or addresses. This disclosure contemplates processor 2302 including any suitable number of any suitable internal caches, where appropriate. As an example, and not by way of limitation, processor 2302 may include one or more instruction caches, one or more data caches, and one or more translation lookaside buffers (TLBs). Instructions in the instruction caches may be copies of instructions in memory 2304 or storage 2306, and the instruction caches may speed up retrieval of those instructions by processor 2302.

Data in the data caches may be copies of data in memory 2304 or storage 2306 for instructions executing at processor 2302 to operate on; the results of previous instructions executed at processor 2302 for access by subsequent instructions executing at processor 2302 or for writing to memory 2304 or storage 2306; or other suitable data. The data caches may speed up read or write operations by processor 2302. The TLBs may speed up virtual-address translation for processor 2302. In particular embodiments, processor 2302 may include one or more internal registers for data, instructions, or addresses. This disclosure contemplates processor 2302 including any suitable number of any suitable internal registers, where appropriate. Where appropriate, processor 2302 may include one or more arithmetic logic units (ALUs); be a multi-core processor; or include one or more processors 2302. Although this disclosure describes and illustrates a particular processor, this disclosure contemplates any suitable processor.

In particular embodiments, memory 2304 includes main memory for storing instructions for processor 2302 to execute or data for processor 2302 to operate on. As an example, and not by way of limitation, computer system 2300 may load instructions from storage 2306 or another source (such as, for example, another computer system 2300) to memory 2304. Processor 2302 may then load the instructions from memory 2304 to an internal register or internal cache. To execute the instructions, processor 2302 may retrieve the instructions from the internal register or internal cache and decode them. During or after execution of the instructions, processor 2302 may write one or more results (which may be intermediate or final results) to the internal register or internal cache. Processor 2302 may then write one or more of those results to memory 2304. In particular embodiments, processor 2302 executes only instructions in one or more internal registers or internal caches or in memory 2304 (as opposed to storage 2306 or elsewhere) and operates only on data in one or more internal registers or internal caches or in memory 2304 (as opposed to storage 2306 or elsewhere).

One or more memory buses (which may each include an address bus and a data bus) may couple processor 2302 to memory 2304. Bus 2312 may include one or more memory buses, as described below. In particular embodiments, one or more memory management units (MMUs) reside between processor 2302 and memory 2304 and facilitate accesses to memory 2304 requested by processor 2302. In particular embodiments, memory 2304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2304 may include one or more memory devices 2304, where appropriate. Although this disclosure describes and illustrates particular memory, this disclosure contemplates any suitable memory.

In particular embodiments, storage 2306 includes mass storage for data or instructions. As an example, and not by way of limitation, storage 2306 may include a hard disk drive (HDD), a floppy disk drive, flash memory, an optical disc, a magneto-optical disc, magnetic tape, or a Universal Serial Bus (USB) drive or a combination of two or more of these. Storage 2306 may include removable or non-removable (or fixed) media, where appropriate. Storage 2306 may be internal or external to computer system 2300, where appropriate. In particular embodiments, storage 2306 is non-volatile, solid-state memory. In particular embodiments, storage 2306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2306 taking any suitable physical form. Storage 2306 may include one or more storage control units facilitating communication between processor 2302 and storage 2306, where appropriate. Where appropriate, storage 2306 may include one or more storages 2306. Although this disclosure describes and illustrates particular storage, this disclosure contemplates any suitable storage.

In particular embodiments, I/O interface 2308 includes hardware, software, or both, providing one or more interfaces for communication between computer system 2300 and one or more I/O devices. Computer system 2300 may include one or more of these I/O devices, where appropriate. One or more of these I/O devices may enable communication between a person and computer system 2300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2306 for them. Where appropriate, I/O interface 2308 may include one or more device or software drivers enabling processor 2302 to drive one or more of these I/O devices. I/O interface 2308 may include one or more I/O interfaces 2306, where appropriate. Although this disclosure describes and illustrates a particular I/O interface, this disclosure contemplates any suitable I/O interface.

In particular embodiments, communication interface 2310 includes hardware, software, or both providing one or more interfaces for communication (such as, for example, packet-based communication) between computer system 2300 and one or more other computer systems 2300 or one or more networks. As an example, and not by way of limitation, communication interface 2310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2310 for it.

As an example, and not by way of limitation, computer system 2300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2300 may include any suitable communication interface 2310 for any of these networks, where appropriate. Communication interface 2310 may include one or more communication interfaces 2310, where appropriate. Although this disclosure describes and illustrates a particular communication interface, this disclosure contemplates any suitable communication interface.

In particular embodiments, bus 2312 includes hardware, software, or both coupling components of computer system 2300 to each other. As an example, and not by way of limitation, bus 2312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2312 may include one or more buses 2312, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
   maintaining a video communication between two or more client devices, wherein each client device comprises one or more cameras, and wherein each client device is associated with a respective video stream in the video communication;
   determining scene data within a field of view in a real-world environment captured by one or more of the cameras of a first client device of the two or more client devices;
   determining, based at least in part on the scene data, a level of engagement, with respect to the video communication, of a participant shown in a first video stream associated with the first client device;

determining, based on the level of engagement of the participant shown in the first video stream with the video stream, a privacy filter, which intentionally obfuscates at least a portion of the participant shown in the first video stream, to apply to the participant shown in the first video stream; and providing instructions to apply the privacy filter to the first video stream in the video communication.

2. The method of claim 1, wherein the privacy filter is a physical camera privacy filter comprising one or more of a movable element with transparency gradient, a semi-transparent layer, a movable patterned element with transparency gradient, a displacement of lenses associated with a camera, or two or more sheets with polarizing filters.

3. The method of claim 1, wherein the privacy filter is a physical element placed in an optical path associated with a camera, and wherein the physical element is operable to change its transparency to at least four different transparency levels.

4. The method of claim 1, wherein on the scene data comprises one or more of:
a level of activity;
a sound in the real-world environment;
a presence of a person within the field of view;
an absence of a person within the field of view;
a location of the real-world environment;
an engagement of a person with respect to the video communication;
a facial expression of a person within the field of view;
a gesture of a person within the field of view;
a pose of a person within the field of view;
a time at the real-world environment; or
weather at the real-world environment.

5. The method of claim 1, wherein the privacy filter is a presence visualization based on one or more of a shape, a motion, a shade, or an animation.

6. The method of claim 1, further comprising:
detecting, based on a person detection model, one or more people within the field of view;
determining, based on a pose detection model, one or more poses of one or more of the detected people; and
determining the scene data based on the determined poses of one or more of the detected people.

7. The method of claim 1, wherein applying the privacy filter results in an obfuscation of the field of view based on one or more of:
a transformation of the field of view;
an overlay to the field of view;
a manipulation of the one or more of the cameras to obfuscate the field of view; or
a partial or complete replacement of the first video stream with one or more virtual elements.

8. An electronic device comprising:
one or more displays;
one or more non-transitory computer-readable storage media including instructions; and
one or more processors coupled to the storage media, the one or more processors configured to execute the instructions to:
maintain a video communication between two or more client devices, wherein each client device comprises one or more cameras, and wherein each client device is associated with a respective video stream in the video communication;

determine scene data within a field of view in a real-world environment captured by one or more of the cameras of a first client device of the two or more client devices;

determine, based at least in part on the scene data, a level of engagement, with respect to the video communication, of a participant shown in a first video stream associated with the first client device;

determine, based on the level of engagement of the participant shown in the first video stream with the video stream, a privacy filter, which intentionally obfuscates at least a portion of the participant shown in the first video stream, to apply to the participant shown in the first video stream; and provide instructions to apply the privacy filter to the first video stream in the video communication.

9. The electronic device of claim 8, wherein the privacy filter is a physical camera privacy filter comprising one or more of a movable element with transparency gradient, a semi-transparent layer, a movable patterned element with transparency gradient, a displacement of lenses associated with a camera, or two or more sheets with polarizing filters.

10. The electronic device of claim 8, wherein the privacy filter is a physical element placed in an optical path associated with a camera, and wherein the physical element is operable to change its transparency to at least four different transparency levels.

11. The electronic device of claim 8, wherein on the scene data comprises one or more of:
a level of activity;
a sound in the real-world environment;
a presence of a person within the field of view;
an absence of a person within the field of view;
a location of the real-world environment;
an engagement of a person with respect to the video communication;
a facial expression of a person within the field of view;
a gesture of a person within the field of view;
a pose of a person within the field of view;
a time at the real-world environment; or
weather at the real-world environment.

12. The electronic device of claim 8, wherein the privacy filter is a presence visualization based on one or more of a shape, a motion, a shade, or an animation.

13. The electronic device of claim 8, wherein the processors are further configured to execute the instructions to:
detect, based on a person detection model, one or more people within the field of view;
determine, based on a pose detection model, one or more poses of one or more of the detected people; and
determine the scene data based on the determined poses of one or more of the detected people.

14. The electronic device of claim 8, wherein applying the privacy filter results in an obfuscation of the field of view based on one or more of:
a transformation of the field of view;
an overlay to the field of view;
a manipulation of the one or more of the cameras to obfuscate the field of view; or
a partial or complete replacement of the first video stream with one or more virtual elements.

15. A computer-readable non-transitory storage media comprising instructions executable by a processor to:
maintain a video communication between two or more client devices, wherein each client device comprises one or more cameras, and wherein each client device is associated with a respective video stream in the video communication;
determine scene data within a field of view in a real-world environment captured by one or more of the cameras of a first client device of the two or more client devices;
determine, based at least in part on the scene data, a level of engagement, with respect to the video communication, of a participant shown in a first video stream associated with the first client device;
determine, based on the level of engagement of the participant shown in the first video stream with the video stream, a privacy filter, which intentionally obfuscates at least a portion of the participant shown in the first video stream, to apply to the participant shown in the first video stream; and
provide instructions to apply the privacy filter to the first video stream in the video communication.

16. The media of claim 15, wherein the privacy filter is a physical camera privacy filter comprising one or more of a movable element with transparency gradient, a semi-transparent layer, a movable patterned element with transparency gradient, a displacement of lenses associated with a camera, or two or more sheets with polarizing filters.

17. The media of claim 15, wherein the privacy filter is a physical element placed in an optical path associated with a camera, and wherein the physical element is operable to change its transparency to at least four different transparency levels.

18. The media of claim 15, wherein on the scene data comprises one or more of:
  a level of activity;
  a sound in the real-world environment;
  a presence of a person within the field of view;
  an absence of a person within the field of view;
  a location of the real-world environment;
  an engagement of a person with respect to the video communication;
  a facial expression of a person within the field of view;
  a gesture of a person within the field of view;
  a pose of a person within the field of view;
  a time at the real-world environment; or
  weather at the real-world environment.

19. The media of claim 15, wherein the privacy filter is a presence visualization based on one or more of a shape, a motion, a shade, or an animation.

20. The media of claim 15, wherein the instructions are further executable by the processor to:
  detect, based on a person detection model, one or more people within the field of view;
  determine, based on a pose detection model, one or more poses of one or more of the detected people; and
  determine the scene data based on the determined poses of one or more of the detected people.

21. A method comprising, by an electronic device:
  maintaining a video communication between two or more client devices, wherein each client device comprises one or more cameras, and wherein each client device is associated with a respective video stream in the video communication;
  determining scene data within a field of view in a real-world environment captured by one or more of the cameras of a first client device of the two or more client devices;
  determining, based at least in part on the scene data, a level of engagement, with respect to the video communication, of a participant shown in a first video stream associated with the first client device;
  determining, based on the level of engagement of the participant shown in the first video stream with the video stream, a privacy filter, which intentionally obfuscates at least a portion of the participant shown in the first video stream, to apply to the participant shown in the first video stream; and
  providing instructions to change a transparency of the privacy filter associated with a first camera of the one or more cameras associated with the first client device of the two or more client devices in response to an electrical signal, wherein the privacy filter comprises a physical element placed in on optical path associated with the first camera, and wherein the physical element is operable to change the transparency of the privacy filter to at least four different transparency levels.

22. The method of claim 21, wherein the privacy filter is a physical camera privacy filter comprising one or more of a movable element with transparency gradient, a semi-transparent layer, a movable patterned element with transparency gradient, a displacement of lenses associated with a camera, or two or more sheets with polarizing filters.

* * * * *